3,013,011
9,11-DIHALO-5-PREGNENES
Alexander L. Nussbaum, Leonia, and Eugene P. Oliveto, Glen Ridge, N.J., assignors to Schering Corporation, Bloomfield, N.J., a corporation of New Jersey
No Drawing. Filed Aug. 14, 1959, Ser. No. 833,706
21 Claims. (Cl. 260—239.55)

This invention relates to a new group of thereapeutically active $\Delta^5$-pregnenes and $\Delta^{1,5}$-pregnadienes and to methods for their manufacture. In particular, this invention relates to $9\alpha,11\beta$-dihalogeno-$17\alpha,21$-dihydroxy-1,5-pregnadiene-3,20-diones, the analogous 1,2-dihydro compounds and the 21-esters thereof.

Our novel compounds may be represented by the following structural formulae:

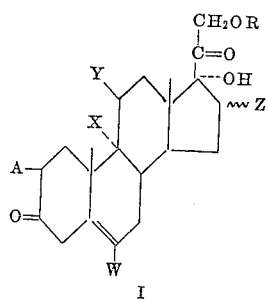

I

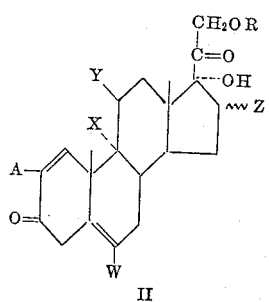

II wherein A and W are members of the group consisting of hydrogen and methyl; R is a member of the group consisting of H and acyl; X is halogen; Y is a halogen having an atomic weight less than 126; Z is a member of the group consisting of hydrogen, an alkyl radical preferably having from 1 to 4 carbon atoms, and OR' wherein R' is a member of the group consisting of hydrogen and lower alkanoyl, and when R' is hydrogen, the $16\alpha,17\alpha$-alkylidenedioxy derivatives thereof.

A bond designated by a wavy line ($\sim$) in the above formulae indicates that the substituent at the 16-position may be in an $\alpha$ or $\beta$-position. In this application, whenever the configuration at 16 is not specifically designated as $\alpha$ or $\beta$, both configurations are included. Thus, the compound name $9\alpha,11\beta$-dichloro-16-methyl-$17\alpha,21$-dihydroxy-1,5-pregnadiene-3,20-dione encompasses the two isomeric configurations, namely $9\alpha$-$11\beta$-dichloro-$16\alpha$-methyl-$17\alpha,21$-dihydroxy-1,5-pregnadiene-3,20-dione and $9\alpha,11\beta$-dichloro-$16\beta$-methyl-$17\alpha,21$-dihydroxy-1,5-pregnadiene-3,20-dione.

Illustrative of the groups encompassed by the term "alkyl" at C-16 are such as $\alpha$-methyl, $\beta$-methyl, $\alpha$-ethyl, $\beta$-ethyl, $\alpha$-propyl, $\beta$-propyl, $\alpha$-isopropyl, $\beta$-isopropyl, $\alpha$-butyl, $\beta$-butyl, $\alpha$(tert.)-butyl and $\beta$-(tert.)-butyl.

Illustrative of the 21-acyl esters contemplated above are lower alkanoates such as acetate, propionate, tertiary butyl acetate, cyclopentylpropionate. Others prepared from dibasic organic acids are succinate, phthalate, and the sulfobenzoates; and those from polybasic inorganic acids are sulfate, phosphate and the like.

The $16\alpha,17\alpha$-alkylidenedioxy-5-pregnenes and 1,5-pregnadienes of our invention are derivatives formed from the corresponding $16\alpha$-$17\alpha$-dihydroxy compounds and a carbonyl compound, i.e. a ketone or an aldehyde such as acetone, methyl-ethyl ketone, butyraldehyde, acetophonone, benzaldehyde, formaldehyde, diethyl ketone, propionaldehyde, acetaldehyde and the like. Thus, the alkylidenedioxy derivative of a $16\alpha,17\alpha,21$-trihydroxy-5-pregnene of our invention such as $9\alpha,11\beta$-dichloro-$16\alpha,$-$17\alpha,21$-trihydroxy-5-pregnene-3,20-dione and, for example, acetone, is $9\alpha,11\beta$-dichloro-$16\alpha,17\alpha$-isopropylidenedioxy-21-hydroxy-5-pregnene-3,20-dione.

Representative compounds of our invention are:

$9\alpha,11\beta$-dichloro-$17\alpha,21$-dihydroxy-5-pregnene-3,20-dione,
$9\alpha,11\beta$-dichloro-$17\alpha,21$-dihydroxy,1,5-pregnadiewne-3,20-dione,
$9\alpha,11\beta$-dichloro-16-methyl-$17\alpha,21$-dihydroxy-5-pregnene-3,20-dione,
$9\alpha,11\beta$-dichloro-16-methyl-$17\alpha,21$-dihydroxy-1,5-pregnadiene-3,20-dione,
6-methyl-$9\alpha,11\beta$-dichloro-$17\alpha,21$-dihydroxy-1,5-pregnadiene-3,20-dione,
$9\alpha$-$11\beta$-dichloro-$16\alpha,17\alpha$-isopropylidenedioxy-21-hydroxy-1,5-pregnadiene-3,20-dione,
$9\alpha,11\beta$-dichloro-$16\alpha,17\alpha,21$-trihydroxy-5-pregnene-3,20-dione,
$2\alpha$-methyl-$9\alpha,11\beta$-dichloro-$17\alpha,21$-dihydroxy-5-pregnene-3,20-dione,
$9\alpha$-$11\beta$-dichloro-$16\alpha$-ethyl-$17\alpha,21$-dihydroxy-5-pregnene-3,20-dione,
$9\alpha$-bromo-$11\beta$-chloro-$17\alpha,21$-dihydroxy-1,5-pregnadiene-3,20-dione,
$9\alpha$-bromo-$11\beta$-chloro-$16\alpha$-ethyl-$17\alpha,21$-dihydroxy-1,5-pregnadiene-3,20-dione,
$9\alpha$-bromo-$11\beta$-fluoro-$16\alpha,17\alpha$-isopropylidenedioxy-21-hydroxy-1,5-pregnadiene-3,20-dione,
6-methyl-$9\alpha$-chloro-$11\beta$-fluoro-$17\alpha,21$-dihydroxy-1,5-pregnadiene-3,20-dione,
$9\alpha,11\beta$-difluoro-$17\alpha,21$-dihydroxy-1,5-pregnadiene-3,20-dione,
$9\alpha,11\beta$-difluoro-16-methyl-$17\alpha,21$-dihydroxy-1,5-pregnadiene-3,20-dione,
$9\alpha$-iodo-$11\beta$-fluoro-$17\alpha,21$-dihydroxy-1,5-pregnadiene-3,20-dione,
$9\alpha$-fluoro-$11\beta$-chloro-$17\alpha,21$-dihydroxy-5-pregnene-3,20-dione,
16-methyl-$9\alpha$-chloro-$11\beta$-fluoro-$16\alpha,17\alpha$-isopropylidenedioxy-21-hydroxy-1,5-pregnadiene-3,20-dione,
6,16-dimethyl-$9\alpha,11\beta$-dichloro-$17\alpha,21$-dihydroxy-5-pregnene-3,20-dione,
6,16-dimethyl-$9\alpha,11\beta$-dichloro-$17\alpha,21$-dihydroxy-1,5-pregnadiene-3,20-dione,
$2\alpha$-methyl-$9\alpha$-chloro-$11\beta$-fluoro-$16\alpha,17\alpha,21$-trihydroxy-5-pregnene-3,20-dione, as well as the 21-acetates of the foregoing compounds and the $16\alpha,21$-diacetates of the aforementioned $16\alpha,17\alpha,$-21-trihydroxy compounds.

Although all the dihalogeno-5-pregnenes and the dihalogeno-1,5-pregnadienes of Formulae I and II are therapeutically useful, the preferred embodiment of our invention are the $9\alpha,11\beta$-dichloro-1,5-pregnadienes of Formula II, and particularly, $9\alpha,11\beta$-dichloro-$16\alpha$-methyl-$17\alpha,21$-dihydroxy-1,5-pregnadiene-3,20-dione, and $9\alpha,11\beta$-dichloro-$16\beta$-methyl-$17\alpha,21$-dihydroxy - 1,5-pregnadiene-3,20-dione.

The new $9\alpha,11\beta$-dihalogeno-5-pregnenes and $9\alpha,11\beta$-dihalogeno-1,5-pregnadienes falling within Formula I and II are anti-inflammatory agents which, advantageously are not salt retaining and which exhibit greater activity and a longer duration of activity than the corresponding non-halogenated-1,5-pregnadienes.

Our novel halogenated 5-pregnenes and the Δ¹-analogs thereof are useful in alleviating conditions such as rheumatoid arthritis, intractable asthma, rheumatic fever, disseminated *Lupus erythematosus*. Our compounds are particularly valuable when administered topically for the treatment of skin ailments such as atopic dermatitis (allergic eczema, food eczema, infantile eczema, nummular eczema, eczamatoid dermatitis; pruritis with lichenification, disseminated neurodermatitis), contact dermatitis due to plants (rhus poisoning) and other substances.

Our therapeutically valuable compounds may be administered in the form of tablets with a solid carrier containing one or more of the usual excipients such as starch, sugar, gums, soaps, clays and the like. Where parenteral administration is indicated, subcutaneous or intramuscular injection of a 21-lower alkanoyl ester dissolved or suspended in a suitable non-toxic liquid vehicle is preferred. Preferably, our 9,11-dihalogeno-1,5-pregnadienes are administered topically, suspended or dissolved in a carrier suitable for topical application such as a hydrocarbon base of the petrolatum type, absorption bases, hydrophilic petrolatum bases, water soluble bases containing polyethylene glycols and lotions. In certain instances a water soluble base is preferred so as to permit proper healing of weeping lesions and overcome intertrigo. Our compounds have been found to be topically effective at very small doses and, moreover, are effective in cases which do not respond to other corticosteroids. Topical preparations containing from 0.05 to 0.5% of one of our compounds are advantageously employed.

Our novel compounds are prepared by subjecting either a 9α,11β-dihalogeno-4-pregnene, a 9α,11β-dihalogeno-1,4-pregnadiene or a 2-methyl, 6-methyl, 16-alkyl, 16α-hydroxy, 16α,17α-alkylidenedioxy or a polysubstituted derivative of the foregoing, which compounds also have a halogen substituent greater than fluorine at C-6, to the action of zinc in alcohol or magnesium in ether or tetrahydrofuran. By proper control of acidity and solvent polarity, the Δ⁵-compounds are formed and isolated. Alternatively, the substituent at C-6 may be pseudohalogen such as tosylate or mesylate or a lower alkanoyloxy group like acetoxy or propionoxy. When the reaction group in the 6-position is halogen or tosylate, the reaction toward the formation of the 9α,11β-dihalogeno-5-pregnenes and the 9α,11β-dihalogeno-1,5-pregnadienes proceeds smoothly at low temperatures in the range of 25 to 50° C. With a mesylate or lower alkanoyloxy ester in the 6-position, higher temperatures in the range of 50–100° C. are preferred to effect the transformation, since at lower temperatures the reaction proceeds quite slowly.

The 9α,11β-dihalogeno-4-pregnenes and 1,4-pregnadienes used as starting compounds in our novel process are described in U.S. Patent No. 2,894,963 of Gould et al. and in copending applications of Gould et al., Serial Nos. 817,046 and 817,048, filed June 1, 1959, and the methods of their manufacture are described in Examples 26A–26D, 30A, 31A, 34A and B, 35A, 36A, 37A, and on pages 68 and 70 of this application.

The 9α,11β-dihalogeno-4-pregnenes and 1,4-pregnadiene starting compounds, as described in the aforementioned patent and applications of Gould et al., are conveniently prepared by reacting the corresponding 9(11)-dehydro-4-pregnene or 9(11)-dehydro-1,4-pregnadiene with a halogen donor. Typical halogen donors which may be used are:

(1) Molecular halogens such as chlorine or bromine,
(2) Molecular halogen donors such as the addition compounds pyridinium bromide perbromide, dioxane dibromide, iodobenzene dichloride, lead tetrafluoride, and antimony pentafluoride,
(3) A mixed halogen molecule such as iodine monochloride,
(4) A mixture of reagents comprising a source of fluorine, such as lead dioxide in conjunction with hydrogen fluoride, and iodosobenzene diacetate with hydrogen fluoride,
(5) A mixture of reagents comprising a positive halogen donor such as a molecular halogen or a compound such as N-chloro-succinimide and N-bromoacetamide, together with a halogen ion having an electronegativity equal to or greater than that of the above-mentioned positive halogen donor. Examples of such mixtures are lithium chloride and chlorine, potassium fluoride and N-bromoacetamide, hydrogen chloride and lithium chloride together with N-chlorosuccinimide, and the like. Whenever a mixture of halogen donor reagents such as those just described are present in a reaction mixture, the more electronegative halogen attacks the 11-position. Thus, a 9(11)-dehydro compound reacted with potassium fluoride and N-iodosuccinimide will yield 9α-iodo-11β-fluoro-derivatives.

When preparing 9,11-dihalogeno-4-pregnene and 1,4-pregnadiene wherein the more electronegative halogen attacks the 9α-position, such as in a 9α-fluoro-11β-chloro derivative, the two halogen atoms may be introduced in a sequence of two distinct reactions. By one such route, a 9β,11β-oxido-pregnene is treated with a hydrohalic acid to obtain the corresponding 9α-halogeno-11β-hydroxy compound, which may then be subjected to one of several reaction sequences whereby the 11β-hydroxy function is replaced by the desired 11β-halogeno group. For example, the 11β-hydroxy group may be oxidized with chromic acid to the 11-keto function, followed by stereospecific reduction at C-11 to the α-configuration, such as with sodium amalgam in alcohol. The resulting 9α-halogeno-11α-hydroxy compound may then be esterified with a sulfonic acid such as p-toluenesulfonic acid, followed by replacement of the 11α-sulfonate with a suitable source of halide ion in an inert solvent. Thus, the 11α-p-tosylate of 9α-fluoro-1,4-pregnadiene-11α,17α,21-triol-3,20-dione 21-acetate upon treatment with lithium chloride in dimethylformamide yields the corresponding 11β-chloro derivative.

The necessary C-6-substituted intermediates are prepared from 3-keto-9α,11β-dihalogeno-4-pregnene and 3-keto-9α,11β-dihalogeno-1,4-pregnadiene starting compounds in a variety of ways. For example, allylic halogenation of a 3-keto-9α,11β-dihalogeno-4-pregnene or a 3-keto-9α,11β-dihalogeno-1,4-pregnadiene with a reagent such as N-bromosuccinimide, N-bromoacetamide, N-chlorosuccinimide, bromine or chlorine in such solvents as dimethylsulfoxide or dioxane yields the corresponding 6,9α,11β-trihalogeno-4-pregenene or 6,9α,11β-trihalogeno-1,4-pregnadiene. Esterification of a 6-hydroxy-9α,11β-dihalogeno-4-pregnene or a 6-hydroxy-9α,11β-dihalogeno-1,4-pregnadiene can be made to yield the tosylate, mesylate or lower alkanoate intermediates. These 6-hydroxy-9α,11β-dihalogeno-4-pregnene and 6-hydroxy-9α,11β-dihalogeno-1,4-pregnadiene starting compounds are prepared by subjecting a 6-desoxy-9α,11β-dihalogeno-4-pregnene or a 6-desoxy-9α,11β-dihalogeno-1,4-pregnadiene to the microbiological oxygenating action of an organism of the genus Chaetomium according to the analogous procedure described in U.S. Patent No. 2,887,499.

Prior to introducing a substituent at the 6-position of a 4-monoene or a 1,4-diene so as to prepare the immediate precursor of the compounds of our invention, we prefer to esterify any reactive hydroxyl groups which may be present, such as a C-16 or C-21, although this is not necessary when the microbiological hydroxylation at C-6 is employed. Thus, for example, in the case of 9α,11β-dichloro-17α,21-dihydroxy-1,4-pregnadiene-3,20-dione, the 21-esters are the preferred starting compounds. In those instances where there is a hydroxyl group also at C-16, such as in 9α,11β-dichloro-16α,17α,21-trihydroxy-1,4-pregnadiene-3,20-dione, the 16α,21-diesters are the preferred starting compounds.

Thus, when preparing 6,9α,11β-trihalogeno-4-pregnene or a 6,9α,11β-trihalogeno-1,4-pregnadiene for use as an immediate precursor of a compound of this invention, a preferred method is to brominate a compound such as 9α,11β - dichloro-17α,21-dihydroxy-1,4-pregnadiene-3,20-dione 21-acetate by means of N-bromosuccinimide in an inert solvent such as chlorobenzene to yield 6β-bromo-9α,11β - dichloro-17α,21-dihydroxy-1,4-pregnadiene-3,20-dione 21-acetate. When brominating a compound which already is substituted at C-6, such as in the case of 6α,16α-dimethyl-9α,11β-dichloro-17α,21-dihydroxy - 1,4 - pregnadiene-3,20-dione 21-acetate and 6β,16α-dimethyl-9α,11β-dichloro-17α,21-dihydroxy-1,4-pregnadiene - 3,20 - dione 21-acetate the configuration of the two substituents at C-6 has not been determined and therefore the 6-bromo-6-methyl intermediates are named without indicating the configuration of the bromo and methyl groups, namely as 6 - bromo-9α,11β-dichloro-6,16α-dimethyl-17α,21-dihydroxy-1,4-pregnadiene-3,20-dione 21-acetate and 6-bromo-9α,11β-dichloro - 6,16α - dimethyl-17α,21-dihydroxy-4-pregnene-3,20-dione respectively.

It is apparent that the 9α,11β-dihalogeno-5-pregnenes and the 9α,11β-dihalogeno-1,5-pregnadienes obtained by our process will of necessity contain the original ester protective groupings. These ester groups may be conveniently hydrolyzed either chemically by the use of dilute acid or, preferably, microbiologically by means of *Flavobacterium dehydrogenans* according to the analogous procedures described in South African Patent No. 3462/55. The polyhydroxy-5-pregnenes and 1,5-pregnadienes thus obtained may be selectively esterified at C-21 by methods well known in the art.

Alternatively, saponification of the protective ester groups may be carried out immediately after introduction of the substituent at C-6 and prior to conversion to a 5-monoene or 1,5-diene. This process is applicable only to those methods wherein the intermediary compound contains a halogen at C-6. The saponification of the ester may be effected by means of a strong acid such as sulfonic, perchloric or p-toluenesulfonic in aqueous alcohol. By way of example, 9α,11β-dichloro-16α-methyl-17α,21-dihydroxy-1,4-pregnadiene-3,20-dione is esterified to yield 9α,11β-dichloro-16α-methyl-17α,21-dihydroxy-1,4-pregnadiene-3,20-dione 21-acetate, whereupon bromine is introduced at C-6 by means of N-bromosuccinimide. The 6-bromo-9α,11β-dichloro-16α-methyl-17α,21-dihydroxy-1,4-pregnadiene-3,20-dione 21-acetate may be saponified to form 6-bromo-9α,11β-dichloro-16α-methyl-17α,21-dihydroxy - 1,4 - pregnadiene-3,20-dione which is then converted into the Δ¹,⁵-analog by reaction with zinc in alcohol yielding the 9α,11β-dichloro-16α-methyl-17α,21-dihydroxy-1,5-pregnadiene-3,20-dione.

A 9α,11β-dihalogeno-5-pregene or a 9α,11β-dihalogeno-1,5-pregnadiene of Formulae I or II, of which the corresponding 9α,11β-dihalogeno-4-pregnene or 9α,11β-diahalogeno-1,4-pregnadiene is not available or known may be prepared from the corresponding 4,9(11)-pregnadienes or 1,4,9(11)-pregnatrienes by methods outlined in the copending applications of Gould et al., supra. The starting 4,9(11)-pregnadienes or 1,4,9(11)-pregnatrienes may be substituted at the 2 or 6 carbon by a methyl group or at the 16-carbon by a hydroxyl, alkyl, lower alkanoyloxy or, when C-16 is hydroxy, a 16α,17α-alkylidenedioxy group. These 2,6 or 16-monosubstituted or 2,16 or 6,16-disubstituted-4,9(11)-pregnadienes and 1,4,9(11)-pregnatrienes are prepared by a combination of methods analogous to known procedures. Thus, for example, 6β,16α - dimethyl-17α,21 - dihydroxy-1,4,9(11)-pregnatriene - 3,20-dione is prepared by treating 16α-methylhydrocortisone (16α - methyl-11β,17α,21 - trihydroxy-4-pregnene-3,20-dione) with ethylene glycol by known procedures to form the 3,20-bis-ethylene ketal derivative which, in turn, is epoxidized on treatment with a peracid such as peracetic or preferably monoperphthalic acid to give the epoxy derivative, 5α,6α - epoxy-16α-methyl-11β,17α,21 - trihydroxypregnane-3,20-dione 3,20-bis-ethylene ketal. From this epoxy derivative the 6-methyl substitutent may be introduced into the pregnane nucleus by the addition of a Grignard reagent such as methyl magnesium iodide with subsequent hydrolysis to yield the 5α-hydroxy-6β-methyl compound, i.e. 5α,11β,17α,21 - tetrahydroxy-6β,16α - dimethylpregnane - 3,20-dione. A reagent such as ethanolic hydrochloric acid on 5α-hydroxy - 6β-methyl-16α-methylpregnane simultaneously dehydrates the 5α-hydroxy group and epimerizes the 6β-substitutent to yield 6α,16α-dimethyl-11β,17α,21-trihydroxy-4-pregnene-3,20-dione. In order to retain a 6β-configuration, the 5α-hydroxy-6β-methylpregnane intermediate is treated with, for example, thionyl chloride in a cold basic medium such as pyridine or in approximately 90% acetic acid to give 6β,16α-dimethyl-11β,17α, 21 - trihydroxy-4-pregnene - 3,20-dione. The 6β,16α-dimethyl-11β-hydroxypregnane compound thus prepared is dehydrated by a reagent such as methanesulfonyl chloride in the presence of pyridine or phosphorous oxychloride in pyridine to give the necessary intermediate, 6β, 16α-dimethyl - 17α,21-dihydroxy-4,9(11) - pregnadiene-3,20-dione. The Δ¹-bond is then introduced by microbiological dehydrogenation with an organism such as *Corynebacterium simplex* (A.T.C.C. 6946) in a manner similar to that described in U.S. Patent No. 2,837,464 or by chemical dehydrogenation through the use of such reagents as chloranil or selenium dioxide to give the desired intermediate 6β,16α-diamethyl-17α,21 - dihydroxy-1,4,9(11)-pregnatriene-3,20-dione. When preparing a 9α,11β-dihalogenated derivative of the thus prepared 6β-methyl-9(11)-dehydro - 1,4-pregnadiene, a 6α-methyl-9α,11β-dihalogeno derivative will be formed from acidic reaction media and 6β-methyl-9α,11β - dihalogeno-1,4-pregnadiene derivatives will result when the halogenation is carried out in a neutral or basic medium. Thus, for example, the 21-acetate of 6β,16α-dimethyl-17α, 21-dihydroxy-1,4,9(11) - pregnatriene-3,20-dione (prepared from the 21-alcohol by known techniques) when chlorinated with chlorine in carbon tetrachloride in the presence of pyridine yields the 6β-methyl halogenated compound, 6β,16α-dimethyl-9α,11β - dichloro-17α,21 - dihydroxy-1,4-pregnadiene-3,20-dione. On the other hand, when the 6β-methylpregnatriene is chlorinated with a mixture of lithium chloride, N-chlorosuccinimide and hydrogen chloride, the 6α-methyl intermediate is formed, i.e. 6α,16α-dimethyl-9α,11β-dichloro-17α,21 - dihydroxy-1,4-pregnadiene-3,20-dione.

This application is a continuation-in-part of our co-pending applications, Serial No. 770,315, filed October 29, 1958 and Serial No. 790,380, filed February 2, 1959, now Patent No. 2,908,696.

The following examples are illustrative of the procedures employed in preparing the compounds of this invention, but are not to be construed as limiting the scope therein; the scope of our invention being limited only by the appended claims.

EXAMPLE 1

*9α,11β-dichloro-17α,21-dihydroxy-1,5-pregnadiene-3,20-dione*

A. 6β-BROMO-9α,11β-DICHLORO-17α,21-DIHYDROXY-1,4-PREGNADIENE-3,20-DIONE 21-ACETATE

A suspension of one gram of 9α,11β-dichloro-17α,21-dihydroxy-1,4-pregnadiene-3,20-dione 21-acetate in 160 ml. of chlorobenzene and 95 ml. of carbon tetrachloride is heated to reflux under a blanket of argon gas, and 590 mg. of recrystallized N-bromosuccinimide and 20 mg. of benzoyl peroxide are added. The mixture turns orange and all the suspended solid dissolves. The reaction vessel is illuminated strongly with an electric light source for a period of approximately ten minutes during which time the solution color changes from orange to yellow. Illumination is discontinued when the solution tests negative to starch iodide paper. The reaction solution is cooled to room temperature, diluted with 250 ml. of methylene chloride, and washed twice with 300 ml. of water. The organic layer is separated, dried over sodium sulfate and evaporated at room temperature to a yellow solid residue which is triturated with hexane and filtered to give 1.17 g. of 6β-bromo-9α,11 -dichloro-17α,21-dihydroxy-1,4 - pregnadiene-3,20 - dione 21-acetate, M.P. 171–180° C. This compound is used without further purification in the following reaction described below.

B. 9α,11β-DICHLORO-17α,21-DIHYDROXY-1,5-PREGNADIENE-3,20-DIONE 21-ACETATE

The 6β-bromo-9α,11β - dichloropregnadiene prepared above is dissolved in 300 ml. of ethanol and 50 ml. of water, the solution warmed to 50° C. and 10 g. of zinc powder added. The suspension is stirred efficiently for 30 minutes then filtered with supercel. The filtrate is concentrated in vacuo to a residue which is then chromatographed over 35 g. of silica gel. The column is eluted with benzene-ether (5:1) and the eluates concentrated to a residue which is recrystallized from acetone to give 273 mg. of 9α,11β-dichloro-17α,21-dihydroxy-1,5-pregnadiene-3,20-dione 21-acetate, M.P. 246–248° C. (dec.)

$$\epsilon_{222}^{MeOH} = 12,300$$

C. 9α,11β-DICHLORO-17α,21-DIHYDROXY-1,5-PREGNADIENE-3,20-DIONE

The 9α,11β-dichloro-1,5-pregnadiene-21-acetate, prepared in Example 1B, is hydrolyzed to the corresponding 21-alcohol with the aid of a culture of *Flavobacterium dehydrogenans* (Rutgers University Collection No. 130) in the following manner.

The culture of the organism is prepared by propagating it in a nutrient agar medium at 30° C. for 24 to 72 hours. During incubation, the inoculated tube is exposed to light with the resultant development of a yellow pigment characteristic of the species. The developed culture is rinsed from an agar slant under strile conditions into a sterile medium of pH 6.8 and having the following composition:

| | Grams |
|---|---|
| Yeast extract (Difco) | 10 |
| Potassium phosphate monobasic | 4.48 |
| Sodium phosphate dibasic | 4.68 |
| Tap water, to 1 liter. | |

This culture medium has previously been autoclaved, as at 15 lb. pressure, for twenty minutes to obtain aseptic conditions, and cooled. The variant is grown in the medium under constant illumination, using the visible range of the spectrum. The incubation temperature is maintained at about 33° C. and is conducted under aerobic conditions. Aeration is accomplished by agitation and/or blowing air through the culture medium.

After the organism has grown for 12 to 24 hours (or longer, if desired), 100 ml. of the growing culture are introduced into each of ten flasks, and to each flask are added 200 mg. of 9α,11β-dichloro-17α,21-dihydroxy-1,5-pregnadiene-3,20-dione 21-acetate dissolved in a minimum volume of ethanol. The reaction mixtures are then shaken at 30° C. for 12 to 72 hours. The reaction is stopped when paper chromatography indicates that the starting material has been transformed.

The contents of the flasks are combined and extracted with methylene chloride. The extracts are concentrated and the residue is crystallized from acetone-hexane affording 9α,11β-dichloro-17α,21-dihydroxy - 1,5 - pregnadiene-3,20-dione as a crystalline solid.

EXAMPLE 2

*6 or 16-mono-substituted-9α,11β-dichloro-17α,21-dihydroxy-1,5-pregnadiene-3,20-dione*

A. 6 OR 16-MONO-SUBSTITUTED-6β-BROMO-9α,11β-DICHLORO-17α,21-DIHYDROXY - 1,4 - PREGNADIENE-3,20-DIONE 21-ACETATE

In the manner described in Example 1A,

6α-methyl-9α,11β-dichloro-17α,21-dihydroxy - 1,4-pregnadiene-3,20-dione 21 acetate,
9α,11β-dichloro-16α-methyl-17α,21-dihydroxy-1,4-pregnadiene-3,20-dione 21-acetate,
9α,11β-dichloro-16β-methyl-17α,21-dihydroxy-1,4-pregnadiene-3,20-dione 21-acetate, and
9α,11β-dichloro-16α,17α-isopropylidenedioxy-21-hydroxy-1,4-pregnadiene,3,20-dione 21-acetate, are each reacted with N-bromosuccinimide in chlorobenzene and carbon tetrachloride and the resultant products isolated and purified to give respectively 6α-methyl-6β-bromo-9α,11β-dichloro-17α-hydroxy-1,4-pregnadiene-3,20-dione 21-acetate,
6β-bromo-9α,11β-dichloro-16α-methyl-17α,21-dihydroxy-1,4-pregnadiene-3,20-dione 21-acetate,
6β-bromo-9α,11β-dichloro-16β-methyl-17α,21-dihydroxy-1,4-pregnadiene-3,20-dione 21-acetate, and
6β-bromo,9α,11β-dichloro-16α,17α-isopropylidenedioxy-21-hydroxy-1,4-pregnadiene-3,20-dione 21-acetate.

B. 6 OR 16-MONO-SUBSTITUTED-9α,11β-DICHLORO-17α,21-DIHYDROXY-1,5-PREGNADIENE-3,20-DIONE 21-ACETATE

In the manner described in Example 1B, the 6β-bromo-9α,11β-dichloropregnadienes prepared as described in Example 2A are each reacted with zinc powder in ethanol water and the resultant products isolated and purified in the described manner to give respectively 6-methyl-9α,11β-dichloro-17α,21-dihydroxy-1,5-pregnadiene-3,20 dione 21-acetate,
9α,11β-dichloro-16α-methyl-17α,21-dihydroxy-1,5-pregnadiene-3,20 dione 21-acetate,
9α,11β-dichloro-16β-methyl-17α,21-dihydroxy-1,5-pregnadiene-3,20-dione 21-acetate and
9α,11β-dichloro-16α,17α-isopropylidenedioxy-21-hydroxy-1,5-pregnadiene-3,20-dione 21-acetate.

C. 6 or 16-MONO-SUBSTITUTED-9α,11β-DICHLORO-17α,21-DIHYDROXY-1,5-PREGNADIENE-3,20-DIONE

In the manner described in Example 1C, the 21-acetate of the 1,5-pregnadienes prepared as described in Example 2B are each hydrolyzed to the corresponding 21-alcohols with the aid of a culture of *Flavobacterium dehydrogenans* and the resultant products isolated and purified to give respectively 6-methyl-9α,11β-dichloro-17α,21-dihydroxy-1,5-pregnadiene-3,20-dione,
9α,11β-dichloro-16α-methyl-17α,21-dihydroxy-1,5-pregnadiene-3,20-dione,
9α,11β-dichloro-16β-methyl-17α,21-dihydroxy-1,5-pregnadiene-3,20-dione, and
9α,11β-dichloro-16α,17α-isopropylidenedioxy -21-hydroxy-1,5-pregnadiene-3,20-dione.

EXAMPLE 3

*9α,11β-dichloro-17α,21-dihydroxy-5-pregnene-3,20-dione*

A. 6β-BROMO-9α,11β-DICHLORO-17α,21-DIHYDROXY-4-PREGNENE-3,20-DIONE 21-ACETATE

A suspension of 1 g. of 9α,11β-dichloro-17α,21-dihydroxy-4-pregnene-3,20-dione 21-acetate in chlorobenzene and carbon tetrachloride is reacted with N-bromosuccinimide and benzoyl peroxide under argon gas in the manner described in Example 1A. The resultant product is isolated and purified in the described manner to give 6β-bromo-9α,11β-dichloro-17α,21-dihydroxy-4-pregnene-3,20-dione 21-acetate.

B. 9α,11β-DICHLORO-17α,21-DIHYDROXY-5-PREGNENE-3,20-DIONE 21-ACETATE

The 6β-bromo-9α,11β-dichloro-4-pregnene of Example 3A is reacted with zinc powder in aqueous ethanol in the manner described in Example 1B. The resultant product is isolated and purified in the described manner to give 9α,11β-dichloro-17α,21-dihydroxy-5-pregnene-3,20-dione 21-acetate.

C. 9α,11β-DICHLORO-17α,21-DIHYDROXY-5-PREGNENE-3,20-DIONE

The 21-acetate of Example 3B is hydrolyzed to the corresponding 21-alcohol with the aid of a culture of *Flavobacterium dehydrogenans* and the resultant product isolated and purified in the manner of Example 1C to give 9α,11β-dichloro-17α,21-dihydroxy-5-pregnene-3,20-dione.

EXAMPLE 4

*2 or 16-mono-substituted-9α,11β-dichloro-17α,21-dihydroxy-5-pregnene-3,20-dione*

A. 2 OR 16-MONO-SUBSTITUTED-6β-BROMO-9α,11β-DICHLORO-17α,21-DIHYDROXY-4-PREGNENE-3,20-DIONE 21-ACETATE

In the manner described in Example 1A, 9α,11β-dichloro-16α,17α,21-trihydroxy-4-pregnene-3,20-dione 16,21-diacetate, 2α-methyl-9α,11β-dichloro-17α,21-dihydroxy-4-pregnene-3,20-dione 21-acetate, 9α,11β-dichloro-16α,17α-isopropylidenedioxy-21-hydroxy-4-pregnene-3,20-dione 21-acetate, and 9α,11β-dichloro-16α-ethyl-17α,21-dihydroxy-4-pregnene-3,20-dione 21-acetate are each reacted with N-bromosuccinimide in chlorobenzene and carbon tetrachloride and the resultant products isolated and purified to give respectively 6β-bromo-9α,11β-dichloro-16α,17α,21-trihydroxy-4-pregnene - 3,20 - dione 16,21-diacetate, 2α-methyl-6β-bromo - 9α,11β - dichloro-17α,21-dihydroxy-4-pregnene-3,20-dione 21-acetate, 6β-bromo - 9α,11β - dichloro-16α,17α-isopropylidenedioxy-21-hydroxy-4-pregnene-3,20-dione 21-acetate, and 6β-bromo-9α,11β-dichloro-16α-ethyl - 17α,21 - dihydroxy-4-pregnene-3,20-dione 21-acetate.

B. 2 OR 16-MONO-SUBSTITUTED-9α,11β-DICHLORO-17α,21-DIHYDROXY-5-PREGNENE-3,20-DIONE 21-ACETATE

In the manner described in Example 1B, the 6β-bromo-9α,11β-dichloro-4-pregnenes prepared as described in Examples 4A are each reacted with zinc powder in ethanol water and the resultant products isolated and purified to give respectively 9α,11β-dichloro-16α,17α,21-trihydroxy-5-pregnene-3,20-dione 16,21-diacetate, 2α-methyl-9α,11β-dichloro-17α,21-dihydroxy-5-pregnene-3,20-dione 21-acetate, 9α,11β-dichloro-16α,17α-isopropylidenedioxy-21-hydroxy-5-pregnene-3,20-dione 21-acetate, and 9α,11β-dichloro-16α-ethyl-17α,21-dihydroxy - 5 - pregnene - 3,20-dione 21-acetate.

C. 2 OR 16-MONO-SUBSTITUTED-9α,11β-DICHLORO-17α,21-DIHYDROXY-5-PREGNENE-3,20-DIONE

In the manner described in Example 1C, the 21-acetate of the 9α,11β-dichloro-5-pregnenes prepared as described in Example 4B are each subjected to the action of a culture of *Flavobacterium dehydrogenans* and the resultant products isolated and purified to yield respectively 9α,11β-dichloro-16α,17α,21-trihydroxy-5-pregnene-3,20-dione, 2α-methyl-9α,11β-dichloro-17α,21-dihydroxy-5-pregnene-3,20-dione, 9α,11β-dichloro-16α,17α-isopropylidenedioxy-21-hydroxy-5-pregnene - 3,20 - dione, and 9α,11β - dichloro-16α-ethyl-17α,21-dihydroxy-5-pregnene-3,20-dione.

EXAMPLE 5

*9α-bromo-11β-chloro-17α,21-dihydroxy-1,5-pregnadiene-3,20-dione*

A. 6β,9α-DIBROMO-11β-CHLORO-17α,21-DIHYDROXY-1,4-PREGNADIENE-3,20-DIONE 21-ACETATE

In the manner described in Example 1A, one gram of 9α-bromo-11β-chloro - 17α,21 - dihydroxy - 1,4 - pregnadiene-3,20-dione 21-acetate suspended in chlorobenzene and carbon tetrachloride is reacted with N-bromosuccinimide and the resultant product isolated and purified to give 6β,9α-dibromo-11β-chloro-17α,21 - dihydroxy - 1,4-pregnadiene-3,20-dione 21-acetate.

B. 9α-BROMO-11β-CHLORO-17α,21-DIHYDROXY-1,5-PREGNADIENE-3,20-DIONE 21-ACETATE

In the manner described in Example 1B, the 6β,9α-dibromo-11β-chloropregnadiene prepared in Example 5A, is reacted with zinc powder in ethanol-water. The resultant product is isolated and purified in the described manner to give 9α-bromo-11β-chloro-17α,21-dihydroxy-1,5-pregnadiene-3,20-dione 21-acetate.

C. 9α-BROMO-11β-CHLORO-17α,21-DIHYDROXY-1,5-PREGNADIENE-3,20-DIONE

The 21-acetate of Example 5B is hydrolyzed to the corresponding 21-alcohol with the aid of a culture of *Flavobacterium dehydrogenans* and the resultant product isolated and purified in the described manner of Example 1C to give 9α-bromo-11β-chloro-17α,21-dihydroxy-1,5-pregnadiene-3,20-dione.

EXAMPLE 6

*16-substituted-9α-bromo-11β-chloro-17α,21-dihydroxy-1,5-pregnadiene-3,20-dione*

A. 16-SUBSTITUTED-6β,9α-DIBROMO-11β-CHLORO-17α,21-DIHYDROXY-1,4-PREGNADIENE-3,20-DIONE 21-ACETATE

In the manner described in Example 1A, 9α-bromo-11β-chloro-16α-ethyl-17α,21-dihydroxy-1,4 - pregnadiene-3,20-dione 21-acetate and 9α-bromo-11β-chloro-16α,17α-isopropylidene-dioxy-21-hydroxy-1,4-pregnadiene - 3,20-dione 21-acetate are each reacted with N-bromosuccinimide in chlorobenzene and carbon tetrachloride and the resultant product isolated and purified to give respectively 6β,9α-dibromo-11β-chloro-16α-ethyl-17α,21-dihydroxy-1,4-pregnadiene-3,20-dione 21-acetate and 6β,9α-dibromo-11β-chloro-16α,17α - isopropylidenedioxy - 21-hydroxy-1,4-pregnadiene-3,20-dione 21-acetate.

B. 16-SUBSTITUTED-9α-BROMO-11β-CHLORO-17α,21-DIHYDROXY-1,5-PREGNADIENE-3,20-DIONE 21-ACETATE

In the manner described in Example 1B, the 6β,9α-dibromo-11β-chloro-1,4-pregnadienes prepared as described in Example 6A are each reacted with zinc powder in ethanol water and the resultant products isolated and purified in the described manner to give respectively 9α-bromo-11β-chloro-16α-ethyl-17α,21 - dihydroxy - 1,5-pregnadiene-3,20-dione 21-acetate and 9α-bromo-11β-chloro-16α,17α-isopropylidenedioxy - 21 - hydroxy - 1,5-pregnadiene-3,20-dione 21-acetate.

C. 16-SUBSTITUTED-9α-BROMO-11β-CHLORO-17α,21-DIHYDROXY-1,5-PREGNADIENE-3,20-DIONE

In the manner described in Example 1C, the 21-acetate of the 9α-bromo-11β-chloro-1,5-pregnadienes prepared in above Example 6B are each subjected to the action of a culture of *Flavobacterium dehydrogenans* and the resultant products isolated and purified to give respectively 9α-bromo-11β-chloro-16α-ethyl - 17α,21 - dihydroxy - 1,5-pregnadiene-3,20-dione and 9α-bromo-11β-chloro-16α,17α-isopropylidenedioxy-21-hydroxy - 1,5 - pregnadiene-3,20-dione.

EXAMPLE 7

*9α-bromo-11β-fluoro-17α,21-dihydroxy-1,5-pregnadiene-3,20-dione*

A. 6β,9α-DIBROMO-11β-FLUORO-17α,21-DIHYDROXY-1,4-PREGNADIENE-3,20-DIONE 21-ACETATE

In the manner described in Example 1A, one gram of 9α - bromo-11β-fluoro-17α,21-dihydroxy-1,4-pregnadiene-3,20-dione 21-acetate suspended in chlorobenzene and carbon tetrachloride is reacted with N-bromosuccinimide and the resultant product isolated and purified to give 6β,9α-dibromo-11β-fluoro-17α,21-dihydroxy - 1,4 - pregnadiene-3,20-dione 21-acetate.

In a similar manner, 9α-bromo-11β-fluoro-17α,21-dihydroxy-4-pregnene-3,20-dione 21-acetate is brominated with N-bromosuccinimide to give 6β,9α-dibromo-11β-fluoro-17α,21-dihydroxy-4-pregnene-3,20-dione 21-acetate.

B. 9α-BROMO-11β-FLUORO-17α,21-DIHYDROXY-1,5-PREGNADIENE-3,20-DIONE 21-ACETATE

In the manner of Example 1B, 6β,9α-dibromo-11β-fluoro-17α,21-dihydroxy-1,4-pregnadiene - 3,20 - dione 21-acetate is reacted with zinc powder in ethanol water and the resultant product isolated and purified to give 9α-bromo-11β-fluoro-17α,21-dihydroxy - 1,5 - pregnadiene-3,20-dione 21-acetate.

In a similar fashion, 6β,9α-dibromo-11β-fluoro-17α,21-dihydroxy-4-pregnene-3,20-dione 21-acetate is reacted with zinc powder in ethanol water to give 9α-bromo-11β-fluoro-17α,21-dihydroxy-5-pregnene-3,20-dione 21-acetate.

C. 9α-BROMO-11β-FLUORO-17α,21-DIHYDROXY-1,5-PREGNADIENE-3,20-DIONE

The 21-acetate of the 1,5-pregnadiene of Example 7B is hydrolyzed according to the procedure of Example 1C with the aid of a culture of *Flavobacterium dehydrogenans* and the resultant product isolated and purified to give 9α-bromo-11β-fluoro-17α,21-dihydroxy - 1,5 - pregnadiene-3,20-dione.

In similar manner, the 21-acetate of the 9α-bromo-11β-fluoro-5-pregnene prepared as in Example 7B is hydrolyzed according to the procedure of Example 1C with the aid of a culture of *Flavobacterium dehydrogenans* to give 9α - bromo-11β-fluoro-17α,21-dihydroxy-5-pregnene-3,20-dione.

EXAMPLE 8

*9α-bromo-11β-fluoro-16α,17α-isopropylidenedioxy-21-hydroxy-1,5-pregnadiene-3,20-dione*

A. 6β,9α - DIBROMO - 11β - FLUORO - 16α,17α - ISOPROPYLIDENEDIOXY-21-HYDROXY - 1,4 - PREGNADIENE - 3,20-DIONE 21-ACETATE

In the manner described in Example 1A, 9α-bromo-11β-fluoro-16α,17α-isopropylidenedioxy-21-hydroxy - 1,4-pregnadiene-3,20-dione 21-acetate is reacted with N-bromosuccinimide in chlorobenzene and carbon tetrachloride and the resultant product isolated and purified to give 6β,9α-dibromo-11β-fluoro-16α,17α-isopropylidenedioxy-21-hydroxy-1,4-pregnadiene-3,20-dione 21-acetate.

B. 9α-BROMO - 11β - FLUORO-16α,17α - ISOPROPYLIDENEDIOXY-21-HYDROXY-1,5-PREGNADIENE-3,20-DIONE 21-ACETATE

In the manner described in Example 1B, the 6β,9α-dibromo-11β-fluoro-1,4-pregnadiene of Example 8A is reacted with zinc in aqueous ethanol and the resultant product isolated and purified to yield 9α-bromo-11β-fluoro-16α,17α - isopropylidenedioxy - 21 - hydroxy - 1,5 - pregnadiene-3,20-dione 21-acetate.

C. 9α-BROMO-11β-FLUORO-16α,17α-ISOPROPYLIDENEDIOXY-21-HYDROXY-1,5-PREGNADIENE-3,20-DIONE

The 21-acetate of Example 8B is hydrolyzed by means of *Flavobacterium dehydrogenans* in the manner of Example 1C to give 9α-bromo-11β-fluoro-16α,17α-isopropylidenedioxy-21-hydroxy-1,5-pregnadiene-3,20-dione.

EXAMPLE 9

*9α-chloro-11β-fluoro-17α,21-dihydroxy-1,5-pregnadiene-3,20-dione*

A. 6β-BROMO-9α-CHLORO - 11β - FLUORO-17α,21-DIHYDROXY-1,4-PREGNADIENE-3,20-DIONE 21-ACETATE

In the manner described in Example 1A, one gram of 9α - chloro - 11β - fluoro - 17α,21 - dihydroxy - 1,4 - pregnadiene-3,20-dione 21-acetate suspended in chlorobenzene and carbon tetrachloride is reacted with N-bromosuccinimide and benzoyl peroxide under argon gas. The resultant product is isolated and purified in the described manner to give 6β-bromo-9α-chloro-11β-fluoro-17α,21-dihydroxy-1,4-pregnadiene-3,20-dione 21-acetate.

B. 9α-CHLORO-11β-FLUORO-17α,21-DIHYDROXY-1,5-PREGNADIENE-3,20-DIONE 21-ACETATE

The 6β-bromo-9α-chloro-11β-fluoropregnadiene of Example 9A is reacted with zinc powder in aqueous ethanol and the resultant product isolated and purified in the manner described in Example 1B to give 9α-chloro-11β-fluoro-17α,21-dihydroxy-1,5-pregnadiene - 3,20 - dione 21-acetate.

C. 9α-CHLORO-11β-FLUORO-17α,21-DIHYDROXY-1,5-PREGNADIENE-3,20-DIONE

The 21-acetate of Example 9B is hydrolyzed to the corresponding 21-alcohol with the aid of a culture of *Flavobacterium dehydrogenans* and the resultant product isolated and purified in the manner of Example 1C to give 9α - chloro - 11β - fluoro - 17α,21 - dihydroxy - 1,5 - pregnadiene-3,20-dione.

EXAMPLE 10

*6 or 16-mono - substituted-9α-chloro-11β-fluoro - 17α,21-dihydroxy-1,5-pregnadiene-3,20-dione*

A. 6 OR 16-MONO-SUBSTITUTED-6β-BROMO-9α-CHLORO-11β-FLUORO - 17α,21-DIHYDROXY - 1,4-PREGNADIENE-3,20-DIONE 21-ACETATE

In the manner described in Example 1A, 9α-chloro-11β-fluoro-16α,17α21-trihydroxy-1,4 - pregnadiene - 3,20-dione 16,21 - diacetate, 9α-chloro-11β-fluoro-16β-methyl-17α,21-dihydroxy-1,4-pregnadiene-3,20-dione 21 - acetate, 6α-methyl-9α-chloro-11β-fluoro - 17α,21 - dihydroxy-1,4-pregnadiene-3,20-dione 21-acetate, and 9α - chloro - 11β-fluoro-16α,17α-isopropylidenedioxy - 21 - hydroxy - 1,4-pregnadiene-3,20-dione 21-acetate are each reacted with N-bromosuccinimide in chlorobenzene and carbon tetrachloride. The resultant products are isolated and purified to give respectively 6β-bromo-9α-chloro-11β-fluoro-16α,-17α,21-trihydroxy-1,4-pregnadiene - 3,20 - dione 16,21-diacetate, 6β-bromo-9α-chloro-11β-fluoro - 16β - methyl-17α,21-dihydroxy-1,4-pregnadiene-3,20-dione 21 - acetate, 6β-bromo-9α-chloro-11β-fluoro-6α-methyl - 17α,21 - dihydroxy-1,4-pregnadiene-3,20-dione 21 - acetate, and 6β-bromo-9α-chloro-11β - fluoro - 16α,17α - isopropylidenedioxy-21-hydroxy-1,4-pregnadiene-3,20-dione 21-acetate.

B. 6 OR 16-MONO-SUBSTITUTED - 9α - CHLORO-11β-FLUORO-17α,21 - DIHYDROXY - 1,5 - PREGNADIENE-3,20-DIONE 21-ACETATE

In the manner described in Example 1B, the 6β-bromo-9α-chloro-11β-fluoro-1,4 - pregnadienes prepared in Example 10A are each reacted with zinc powder in aqueous ethanol and the resultant products isolated and purified to give respectively 9α-chloro-11β-fluoro-16α,17α,21 - trihydroxy-1,5-pregnadiene-3,20 - dione 16,21 - diacetate, 9α-chloro-11β-fluoro-16β-methyl-17α,21 - dihydroxy - 1,5-pregnadiene-3,20-dione 21-acetate, 6α-methyl-9α-chloro-11β-fluoro-17α,21-dihydroxy-1,5-pregnadiene-3,20 - dione 21-acetate, and 9α-chloro-11β-fluoro-16α,17α-isopropylidene-dioxy-21-hydroxy-1,5-pregnadiene - 3,20 - dione 21-acetate.

C. 6 OR 16-MONO-SUBSTITUTED - 9α - CHLORO-11β-FLUORO-17α,21 - DIHYDROXY - 1,5 - PREGNADIENE-3,20-DIONE

In the manner described in Example 1C, the 21-acetate of the 1,5-pregnadienes prepared in Example 10B are each hydrolyzed with the aid of a culture of *Flavobacterium dehydrogenans* and the resultant products isolated and purified to give respectively 9α-chloro-11β - fluoro-16α,17α,21-trihydroxy-1,5-pregnadiene - 3,20 - dione, 9α-chloro-11β-fluoro-16β-methyl - 17α,21 - dihydroxy - 1,5-pregnadiene-3,20-dione, 6-methyl-9α-chloro-11β - fluoro-17α,21-dihydroxy-1,5-pregnadiene - 3,20 - dione and 9α-chloro-11β-fluoro-16α,17α - isopropylidenedioxy - 21-hydroxy-1,5-pregnadiene-3,20-dione.

EXAMPLE 11

*2α-methyl-9α-chloro-11β - fluoro - 17α,21 - dihydroxy-5-pregnene-3,20-dione*

A. 2α-METHYL-6β-BROMO-9α-CHLORO-11β-FLUORO-17α,21-DIHYDROXY-4-PREGNENE-3,20-DIONE 21-ACETATE

In the manner described in Example 1A, 2α-methyl-9α-chloro-11β-fluoro-17α,21 - dihydroxy - 4 - pregnene-3,20-dione 21-acetate is brominated with N-bromosuccinimide in chlorobenzene and carbon tetrachloride and the resultant product isolated and purified to give 2α-methyl-6β-bromo-9α-chloro - 11β-fluoro - 17α,21 - dihydroxy-4-pregnene-3,20-dione 21-acetate.

B. 2α-METHYL-9α-CHLORO-11β-FLUORO-17α,21-DIHYDROXY-5-PREGNENE-3,20-DIONE 21-ACETATE

In the manner described in Example 1B, 2α-methyl-6β-bromo-9α-chloro-11β-fluoro - 17α,21 - dihydroxy - 4-pregnene-3,20-dione 21-acetate is reacted with zinc powder in aqueous ethanol and the resultant product isolated and purified to give 2α-methyl-9α-chloro - 11β - fluoro-17α,21-dihydroxy-5-pregnene-3,20-dione 21-acetate.

C. 2α-METHYL-9α-CHLORO-11β-FLUORO-17α,21-DIHYDROXY-5-PREGNENE-3,20-DIONE

The 21-acetate of the 5-pregnene prepared in Example 11B is subjected to the action of a culture of *Flavobacterium dehydrogenans* in the manner described in Example 1C and the resultant product isolated and purified to give 2α-methyl-9α-chloro-11β-fluoro-17α,21 - dihydroxy-5-pregnene-3,20-dione.

EXAMPLE 12

*9α,11β-difluoro-17α,21-dihydroxy - 1,5-pregnadiene-3,20-dione*

A. 6β-BROMO-9α,11β-DIFLUORO-17α,21-DIHYDROXY-1,4-PREGNADIENE-3,20-DIONE 21-ACETATE

In the manner described in Example 1A, 9α,11β-difluoro-17α,21-dihydroxy-1,4-pregnadiene-3,20 - dione 21-acetate is brominated with N-bromosuccinimide in chlorobenzene and carbone tetrachloride and the resultant produce isolated and purified to give 6β-bromo-9α,11β-difluoro-17α,21-dihydroxy-1,4-pregnadiene-3,20-dione 21 acetate.

B. 9α,11β-DIFLUORO-17α,21-DIHYDROXY-1,5-PREGNADIENE-3,20-DIONE 21-ACETATE

In the manner described in Example 1B, 6β-bromo-9α-11β-difluoro-17α,21-dihydroxy-1,4-pregnadiene - 3,20-dione 21-acetate is reacted with zinc in aqueous ethanol and the resultant product isolated and purified to give 9α,11β-difluoro-17α,21-dihydroxy-1,5-pregnadiene - 3,20-dione 21-acetate.

C. 9α,11β-DIFLUORO-17α,21-DIHYDROXY-1,5-PREGNADIENE-3,20-DIONE

The 21-acetate of the 1,5-pregnadiene of Example 12B is hydrolyzed with the aid of a culture of *Flavobacterium dehydrogenans* in the manner described in Example 1C and the resultant product isolated and purified to give 9α,11β-difluoro-17α,21 - dihydroxy - 1,5 - pregnadiene-3,20-dione.

EXAMPLE 13

*6 or 16-mono-substituted-9α,11β-difluoro-17α,21-dihydroxy-1,5-pregnadiene-3,20-dione*

A. 6 OR 16-MONO-SUBSTITUTED - 6β - BROMO-9α,11β-DIFLUORO-17α,21-DIHYDROXY - 1,4 - PREGNADIENE-3,20-DIONE 21-ACETATE

In the manner described in Example 1A, 6α-methyl-9α,11β-difluoro-17α,21-dihydroxy-1,4 - pregnadiene-3,20-dione 21-acetate, 9α,11β-difluoro-16α-methyl-17α,21-dihydroxy-1,4-pregnadiene-3,20-dione 21-acetate, and 9α,11β-difluoro -16β-methyl-17α,21-dihydroxy-1,4 - pregnadiene-3,20-dione 21-acetate are each reacted with N-bromo succinimide in chlorobenzene and carbon tetrachloride and the resultant products isolated and purified to give respectively 6α-methyl-6β-bromo-9α,11β-difluoro-17α,21-dihydroxy-1,4 - pregnadiene - 3,20-dione 21-acetate, 6β-bromo - 9α,11β - difluoro-16α - methyl-17α,21-dihydroxy-1,4-pregnadiene-3,20-dione 21-acetate, and 6β-bromo-9α,11β-difluoro-16β - methyl-17α,21-dihydroxy-1,4 - pregnadiene-3,20-dione 21-acetate.

B. 6 OR 16-MONO-SUBSTITUTED-9α,11β-DIFLUORO-17α,21-DIHYDROXY-1,5-PREGNADIENE-3,20-DIONE 21-ACETATE

In the manner of Example 1B, the 6β-bromo-9α,11β-difluoro-1,4-pregnadienes prepared in above Example 13A are each reacted with zinc in aqueous ethanol and the resultant products isolated and purified to give respectively 6α-methyl - 9α,11β - difluoro-17α,21-dihydroxy-1,5-pregnadiene - 3,20-dione 21-acetate, 9α,11β - difluoro-16α-methyl -17α,21-dihydroxy-1,5 - pregnadiene - 3,20-dione 21-acetate, and 9α,11β-difluoro-16β-methyl-17α,21-dihydroxy-1,5-pregnadiene-3,20-dione 21-acetate.

C. 6 OR 16 - MONO-SUBSTITUTED-9α,11β-DIFLUORO-17α,21-DIHYDROXY-1,5-PREGNADIENE-3,20-DIONE

The 21-acetates of the 9α,11β-difluoro-1,5-pregnadienes of Example 13B are hydrolyzed in the manner described in Example 1C with the aid of *Flavobacterium dehydrogenans* to give respectively 6α-methyl-9α,11β-difluoro-17α,21-dihydroxy-1,5-pregnadiene - 3,20-dione, 9α,11β - difluoro-16α-methyl-17α,21- dihydroxy-1,5 - pregnadiene-3,20-dione and 9α,11β - difluoro-16β - methyl-17α, 21-dihydroxy-1,5-pregnadiene-3,20-dione.

EXAMPLE 14

*9α,11β-difluoro-17α,21-dihydroxy-5-pregnene-3,20 dione*

A. 6β-BROMO-9α,11β-DIFLUORO-17α,21-DIHYDROXY-4-PREGNENE-3,20-DIONE 21-ACETATE

In the manner of Example 1A, 9α,11β-difluoro-17α,21-dihydroxy-4-pregnene-3,20-dione 21-acetate is brominated with N-bromosuccinimide in chlorobenzene and carbon tetrachloride and the resultant product isolated and purified to give 6β-bromo - 9α,11β - difluoro-17α,21-dihydroxy-4-pregnene-3,20-dione 21-acetate.

Similarly, 2α-methyl-9α,11β-difluoro-17α,21-dihydroxy-4-pregnene-3,20-dione 21-acetate is brominated with N-bromosuccinimide to give 2α-methyl-6β-bromo-9α,11β-difluoro-17α,21- dihydroxy-4 - pregnene-3,20-dione 21-acetate.

B. 9α,11β-DIFLUORO-17α,21-DIHYDROXY-5-PREGNENE-3,20-DIONE 21-ACETATE

In the manner of Example 1B, 6β-bromo-9α,11β-difluoro-17α,21-dihydroxy-4-pregnene-3,20-dione 21-acetate is reacted with zinc powder in aqueous ethanol and the resultant product isolated and purified to give 9α,11β-difluoro-17α,21-dihydroxy-5 - pregnene-3,20-dione 21-acetate.

In a similar manner, 2α-methyl-6β-bromo-9α,11β-difluoro-17α,21-dihydroxy-4-pregnene-3,20-dione 21-acetate is reacted with zinc in aqueous ethanol and the resultant product isolated and purified to give 2α-methyl-9α,11β-difluoro-17α,21-dihydroxy-5-pregnene-3,20-dione 21-acetate.

C. 9α,11β-DIFLUORO-17α,21-DIHYDROXY-5-PREGNENE-3,20-DIONE

The 21-acetate of Example 14B is hydrolyzed in the manner described in Example 1C with the aid of a culture of *Flavobacterium dehydrogenans* to give 9α,11β-difluoro-17α,21-dihydroxy-5-pregnene-3,20-dione.

Similarly, 2α-methyl-9α,11β-difluoro-17α,21-dihydroxy-5-pregnene-3,20-dione 21-acetate is hydrolyzed by means of *Flavobacterium dehydrogenans* to give 2α-methyl-9α,11β-difluoro-17α-21-dihydroxy-5-pregnene-3,20-dione.

EXAMPLE 15

*9α,11β - dibromo-17α,21-dihydroxy-1,5-pregnadiene-3,20-dione*

A. 6β,9α,11β-TRIBROMO-17α,21-DIHYDROXY-1,4-PREGNADIENE-3,20-DIONE 21-ACETATE

In the manner described in Example 1A, 9α,11β-dibromo-17α,21-dihydroxy-1,4-pregnadiene - 3,20-dione 21-acetate is reacted with N-bromosuccinimide in chlorobenzene and carbon tetrachloride and the resultant product isolated and purified to give 6β,9α,11β-tribromo-17α,21-dihydroxy-1,4-pregnadiene-3,20-dione 21-acetate.

B. 9α,11β-DIBROMO-17α,21-DYHYDROXY-1,5-PREGNADIENE-3,20-DIONE 21-ACETATE

In the manner described in Example 1B, 6β,9α,11β-tribromo-17α,21-dihydroxy-1,4 - pregnadiene - 3,20-dione 21-acetate is reacted with zinc powder in aqueous ethanol and the resultant product isolated and purified to give 9α,11β-dibromo-17α,21-dihydroxy-1,5 - pregnadiene-3,20-dione 21-acetate.

C. 9α,11β-DIBROMO-17α,21-DIHYDROXY-1,5-PREGNADIENE-3,20-DIONE

The 21-acetate of the 6β,9α,11β-tribromo-1,5-pregnadiene of Example 15B is hydrolyzed by means of *Flavobacterium dehydrogenans* and the resultant product isolated and purified to give 9α,11β-dibromo-17α,21-dihydroxy-1,5-pregnadiene-3,20-dione.

EXAMPLE 16

*9α-iodo-11β - chloro-17α,21-dihydroxy-1,5 - pregnadiene-3,20-dione*

A. 6β-BROMO-9α-IODO-11β-CHLORO-17α,21-DIHYDROXY-1,4-PREGNADIENE-3,20-DIONE 21-ACETATE

In the manner of Example 1A, 9α-iodo-11β-chloro-17α,21-dihydroxy-1,4-pregnadiene-3,20-dione 21-acetate is brominated with N-bromosuccinimide in chlorobenzene and carbon tetrachloride and the resultant product isolated and purified to give 6β-bromo-9α-iodo-11β-chloro-17α,21-dihydroxy-1,4-pregnadiene-3,20-dione 21-acetate.

B. 9α-IODO-11β-CHLORO-17α,21-DIHYDROXY-1,5-PREGNADIENE-3,20-DIONE 21-ACETATE

In the manner described in Example 1B, 6β-bromo-9α-iodo-11β-chloro-17α,21-dihydroxy- 1,4 - pregnadiene-3,20-dione 21-acetate is reacted with zinc powder in aqueous ethanol and the resultant product isolated and purified to give 9α-iodo-11β-chloro-17α,21-dihydroxy-1,5 - pregnadiene-3,20-dione 21-acetate.

C. 9α-IODO-11β-CHLORO-17α,21-DIHYDROXY-1,5-PREGNADIENE-3,20-DIONE

The 21-acetate of Example 16B is hydroxyed in the manner described in Example 1C with the aid of a culture of *Flavobacterium dehydrogenans* and the resultant product isolated and purified to give 9α-iodo-11β-chloro-17α,21-dihydroxy-1,5-pregnadiene-3,20-dione.

EXAMPLE 17

*9α-iodo-11β-fluoro-17α,21-dihydroxy-1,5-pregnadiene-3,20-dione*

A. 6β-BROMO-9α-IODO-11β-FLUORO-17α,21-DIHYDROXY-1,4-PREGNADIENE-3,20-DIONE 21-ACETATE

In the manner of Example 1A, 9α-iodo-11β-fluoro-17α,21-dihydroxy-1,4-pregnadiene-3,20-dione 21 - acetate is reacted with N-bromosuccinimide in chlorobenzene and carbon tetrachloride and the resultant product isolated and purified to give 6β-bromo-9α-iodo-11β-fluoro-17α,21-dihydroxy-1,4-pregnadiene-3,20-dione 21-acetate.

In a similar fashion, 9α-iodo-11β-fluoro-16α,17α-isopropylidenedioxy-21-hydroxy-1,4-pregnadiene-3,20- dione 21-acetate is brominated with N-bromosuccinimide to give 6β-bromo-9α-iodo-11β-fluoro - 16α,17α - isopropylidenedioxy-21-hydroxy-1,4-pregnadiene-3,20-dione 21-acetate.

B. 9α-IODO-11β-FLUORO-17α,21-DIHYDROXY-1,5-PREGNADIENE-3,20-DIONE 21-ACETATE

In the manner of Example 1B, 6β-bromo-9α-iodo-11β-fluoro-17α,21-dihydroxy-1,4-pregnadiene - 3,20 - dione 21-acetate is reacted with zinc in ethanol and the resultant product isolated and purified to give 9α-iodo-11β-fluoro-17α,21-dihydroxy-1,5-pregnadiene-3,20-dione 21-acetae.

Similarly, 6β-bromo-9α-iodo-11β - fluoro - 16α,17α-isopropylidenedioxy-21-hydroxy-1,4-pregnadiene-3,20 - dione 21-acetate prepared as described in Example 17A is reacted with zinc powder in aqueous ethanol to give 9α-iodo-11β-chloro-16α,17α-isopropylidenedioxy-21-hydroxy-1,5-pregnadiene-3,20-dione 21-acetate.

C. 9α-IODO-11β-FLUORO-17α,21-DIHYDROXY-1,5-PREGNADIENE-3,20-DIONE

9α-iodo-11β-fluoro-17α,21-dihydroxy- 1,5 - pregnadiene-3,2-dione 21-acetate is hydrolyzed by means of a culture of *Flavobacterium dehydrogenans* in the manner described in Example 1C to give 9α-iodo-11β-fluoro-17α,21-dihydroxy-1,5-pregnadiene-3,20-dione.

Similarly, 9α-iodo-11β-fluoro-16α,17α - isopropylidenedioxy-21-hydroxy-1,5-pregnadiene-3,20-dione 21-acetate is hydrolyzed with *Flavobacterium dehydrogenans* to give 9α-iodo-11β-fluoro-16α,17α-isopropylidenedioxy - 21 - hydroxy-1,5-pregnadiene-3,20-dione.

EXAMPLE 18

*9α-fluoro-11β-bromo-17α,21-dihydroxy-1,5-pregnadiene-3,20-dione*

A. 6β,11β-DIBROMO-9α-FLUORO-17α,21-DIHYDROXY-1,4-PREGNADIENE-3,20-DIONE 21-ACETATE

In the manner of Example 1A, 9α-fluoro-11β-bromo-17α,21-dihydroxy-1,4-pregnadiene-3,20-dione 21-acetate is brominated with N-bromosuccinimide in chlorobenzene and carbon tetrachloride and the resultant product isolated and purified to give 6β,11β-dibromo-9α-fluoro-17α,21-dihydroxy-1,4-pregnadiene-3,20-dione 21-acetate.

In the same manner, 9α-fluoro-11β-bromo-17α,21-dihydroxy-4-pregnene-3,20-dione 21-acetate is brominated with N-bromosuccinimide to give 6β,11β-dibromo-9α-fluoro-17α,21-dihydroxy-4-pregnene-3,20-dione 21-acetate.

B. 9α-FLUORO-11β-BROMO-17α,21-DIHYDROXY-1,5-PREGNADIENE-3,20-DIONE 21-ACETATE

In the manner of Example 1B, 6β,11β-dibromo-9α-fluoro-17α,21-dihydroxy-1,4-pregnadiene - 3,20 - dione 21-acetate is reacted with zinc powder in aqueous ethanol and the resultant product isolated and purified to give 9α-fluoro-11β-bromo-17α,21-dihydroxy-1,5-pregnadiene-3,20-dione 21-acetate.

Similarly, 6β,11β-dibromo-9α-fluoro-17α,21-dihydroxy-4-pregnene-3,20-dione 21-acetate prepared as described in Example 18A is reacted with zinc in aqueous alcohol to give 9α-fluoro-11β-bromo-17α,21-dihydroxy-5 - pregnene-3,20-dione 21-acetate.

C. 9α-FLUORO-11β-BROMO-17α,21-DIHYDROXY-1,5-PREGNADIENE-3,20-DIONE

In the manner described in Example 1C, 9α-fluoro-11β-bromo-17α,21-dihydroxy-1,5-pregnadiene-3,20-dione 21-acetate is hydrolyzed by means of *Flavobacterium dehydrogenans* and the resultant product isolated and purified to give 9α-fluoro-11β-bromo-17α,21-dihydroxy-1,5-pregnadiene-3,20-dione.

Similarly, 9α-fluoro-11β-bromo-17α,21-dihydroxy-5-pregnene-3,20-dione 21-acetate is hydrolyzed by means of *Flavobacterium dehydrogenans* to give 9α-fluoro-11β-bromo-17α,21-dihydroxy-5-pregnene-3,20-dione.

EXAMPLE 19

*9α-fluoro-11β-chloro-17α,21-dihydroxy-1,5-pregnadiene-3,20-dione*

A. 6β-BROMO-9α-FLUORO-11β-CHLORO-17α,21-DIHYDROXY-1,4-PREGNADIENE-3,20-DIONE 21-ACETATE

In the manner of Example 1A, 9α-fluoro-11β-chloro-17α,21-dihydroxy-1,4-pregnadiene-3,20-dione 21-acetate is brominated with N-bromosuccinimide in chlorobenzene and carbon tetrachloride and the resultant product isolated and purified to give 6β-bromo-9α-fluoro-11β-chloro-17α,21-dihydroxy-1,4-pregnadiene-3,20-dione 21-acetate.

In similar manner, 9α-fluoro-11β-chloro-17α,21-dihydroxy-4-pregnene-3,20-dione 21-acetate is brominated with N-bromosuccinimide to give 6β-bromo-9α-fluoro-11β-chloro-17α,21-dihydroxy-4-pregnene-3,20-dione 21-acetate.

B. 9α-FLUORO-11β-CHLORO-17α,21-DIHYDROXY-1,5-PREGNADIENE-3,20-DIONE 21-ACETATE

In the manner of Example 1B, 6β-bromo-9α-fluoro-11β-chloro-17α,21-dihydroxy-1,4-pregnadiene-3,20-dione 21-acetate is reacted with zinc powder in aqueous ethanol and the resultant product isolated and purified to give 9α-fluoro-11β-chloro-17α,21-dihydroxy-1,5-pregnadiene-3,20-dione 21-acetate.

In similar manner, 6β-bromo-9α-fluoro-11β-chloro-17α,21-dihydroxy-4-pregnene-3,20-dione 21-acetate prepared as described in Example 19A is reacted with zinc in aqueous ethanol to give 9α-fluoro-11β-chloro-17α,21-dihydroxy-5-pregnene-3,20-dione 21-acetate.

C. 9α-FLUORO-11β-CHLORO-17α,21-DIHYDROXY-1,5-PREGNADIENE-3,20-DIONE

The 21-acetate of the 1,5-pregnadiene of Example 19B is hydrolyzed with *Flavobacterium dehydrogenans* in the manner of Example 1C and the resultant product isolated and purified to give 9α-fluoro-11β-chloro-17α,21-dihydroxy-1,5-pregnadiene-3,20-dione.

In similar manner, 9α-fluoro-11β-chloro-17α,21-dihydroxy-5-pregnene-3,20-dione 21-acetate prepared as described in Example 19B is hydrolyzed with *Flavobacterium dehydrogenans* to give 9α-fluoro-11β-chloro-17α,21-dihydroxy-5-pregnene-3,20-dione.

EXAMPLE 20

*9α-chloro-11β-bromo-17α,21-dihydroxy-1,5-pregnadiene-3,20-dione*

A. 6β,11β-DIBROMO-9α-CHLORO-17α,21-DIHYDROXY-1,4-PREGNADIENE-3,20-DIONE 21-ACETATE

In the manner of Example 1A, 9α-chloro-11β-bromo-17α,21-dihydroxy-1,4-pregnadiene-3,20-dione 21-acetate is brominated with N-bromosuccinimide in chlorobenzene and carbon tetrachloride and the resultant product isolated and purified to give 6β,11β-dibromo-9α-chloro-17α,21-dihydroxy-1,4-pregnadiene-3,20-dione 21-acetate.

In similar manner, 9α-chloro-11β-bromo-17α,21-dihydroxy-4-pregnene-3,20-dione 21-acetate is brominated with N-bromosuccinimide to give 6β,11β-dibromo-9α-chloro-17α,21-dihydroxy-4-pregnene-3,20-dione 21-acetate.

B. 9α-CHLORO-11β-BROMO-17α,21-DIHYDROXY-1,5-PREGNADIENE-3,20-DIONE 21-ACETATE

In the manner of Example 1B, the 6β,11β-dibromo-9α-chloro-1,4-pregnadiene of Example 20A is reacted with zinc powder in aqueous ethanol and the resultant product isolated and purified to give 9α-chloro-11β-bromo-17α,21-dihydroxy-1,5-pregnadiene-3,20-dione 21-acetate.

Similarly, 6β,11β-dibromo-9α-chloro-17α,21-dihydroxy-4-pregnene-3,20-dione 21-acetate prepared as in Example 20A is reacted with zinc in aqueous ethanol to give 9α-chloro-11β-bromo-17α,21-dihydroxy-5-pregnene-3,20-dione 21-acetate.

C. 9α-CHLORO-11β-BROMO-17α,21-DIHYDROXY-1,5-PREGNADIENE-3,20-DIONE

The 21-acetate of the 1,5-pregnadiene of Example 20B is hydrolyzed in the manner of Example 1C with a culture of *Flavobacterium dehydrogenans* and the resultant product isolated and purified to give 9α-chloro-11β-bromo-17α,21-dihydroxy-1,5-pregnadiene-3,20-dione.

In similar manner, 9α-chloro-11β-bromo-17α,21-dihydroxy-5-pregnene-3,20-dione 21-acetate is hydrolyzed with *Flavobacterium dehydrogenans* to give 9α-chloro-11β-bromo-17α,21-dihydroxy-5-pregnene-3,20-dione.

EXAMPLE 21

*6-methyl-9α-chloro-11β-fluoro-16α,17α-isopropylidenedioxy-21-hydroxy-1,5-pregnadiene-3,20-dione*

A. 6α-METHYL-6β-BROMO-9α-CHLORO-11β-FLUORO-16α,17α-ISOPROPYLIDENEDIOXY-21-HYDROXY-1,4-PREGNADIENE-3,20-DIONE 21-ACETATE

According to the procedure of Example 1A, 6α-methyl-9α-chloro-11β-fluoro-16α,17α-isopropylidenedioxy-21-hydroxy-1,4-pregnadiene-3,20-dione 21-acetate is brominated with N-bromosuccinimide in chlorobenzene and carbon tetrachloride and the resultant product isolated and purified to give 6α-methyl-6β-bromo-9α-chloro-11β-fluoro-16α,17α-isopropylidenedioxy-21-hydroxy-1,4-pregnadiene-3,20-dione 21-acetate.

B. 6-METHYL-9α-CHLORO-11β-FLUORO-16α,17α-ISOPROPYLIDENEDIOXY-21-HYDROXY-1,5-PREGNADIENE-3,20-DIONE 21-ACETATE

In the manner of Example 1B, the 6α-methyl-6β-bromo-9α-chloro-11β-fluoro-1,5-pregnadiene of Example 21A is reacted with zinc powder in aqueous ethanol and the resultant product isolated and purified to give 6-methyl-9α-chloro-11β-fluoro-16α,17α-isopropylidenedioxy-21-hydroxy-1,5-pregnadiene-3,20-dione 21-acetate.

C. 6-METHYL-9α-CHLORO-11β-FLUORO-16α,17α-ISOPROPYLIDENEDIOXY-21-HYDROXY-1,5-PREGNADIENE-3,20-DIONE

The 21-acetate of Example 21B is hydrolyzed with *Flavobacterium dehydrogenans* in the manner described in Example 1C to give 6-methyl-9α-chloro-11β-fluoro-16α,17α-isopropylidenedioxy-21-hydroxy-1,5-pregnadiene-3,20-dione.

EXAMPLE 22

*2α-methyl-9α-chloro-11β-fluoro-16α,17α-isopropylidenedioxy-21-hydroxy-5-pregnene-3,20-dione*

A. 2α-METHYL-6β-BROMO-9α-CHLORO-11β-FLUORO-16α,17α-ISOPROPYLIDENEDIOXY-21-HYDROXY-4-PREGNENE-3,20-DIONE 21-ACETATE

2α-methyl-9α-chloro-11β-fluoro-16α,17α-isopropylidenedioxy-21-hydroxy-4-pregnene-3,20-dione 21-acetate is brominated with N-bromosuccinimide in the manner of Example 1A and the resultant product isolated and purified to give 2α-methyl-6β-bromo-9α-chloro-11β-fluoro-16α,17α-isopropylidenedioxy-21-hydroxy-4-pregnene-3,20-dione 21-acetate.

B. 2α-METHYL-9α-CHLORO-11β-FLUORO-16α,17α-ISOPROPYLIDENEDIOXY-21-HYDROXY-5-PREGNENE-3,20-DIONE 21-ACETATE

In the manner of Example 1B, the 2α-methyl-6β-bromo-11β-fluoro-4-pregnene of Example 22A is reacted with zinc in aqueous ethanol and the resultant product isolated and purified to give 2α-methyl-9α-chloro-11β-fluoro- 16α,17α - isopropylidenedioxy - 21 - hydroxy - 5 - pregnene-3,20-dione 21-acetate.

C. 2α-METHYL-9α - CHLORO-11β-FLUORO - 16α,17α - ISOPROPYLIDENEDIOXY - 21 - HYDROXY - 5 - PREGNENE-3,20-DIONE 21-ACETATE

The 21-acetate of Example 22B is hydrolyzed with *Flavobacterium dehydrogenans* in the manner described in Example 1C to give 2α-methyl-9α-chloro-11β-fluoro-16α,17α - isopropylidenedioxy - 21 - hydroxy - 5 - pregnene-3,20-dione.

EXAMPLE 23

*The preparation of the 21-esters*

Following the procedures of Examples 1A and 1B,

9α,11β-dichloro-17α,21-dihydroxy-1,4-pregnadiene-3,20-dione 21-propionate,
9α,11β-dichloro-16α,17α-isopropylidenedioxy-21-hydroxy-1,4-pregnadiene-3,20-dione 21-propionate,
9α,11β-difluoro-17α,21-dihydroxy-1,4-pregnadiene-3,20-dione 21-propionate,
9α,11β-dichloro-17α,21-dihydroxy-1,4-pregnadiene-3,20-dione 21-t-butylacetate,
9α,11β-dichloro-16α,17α-isopropylidenedioxy-21-hydroxy-1,4-pregnadiene-3,20-dione 21-t-butylacetate,
9α-bromo-11β-fluoro-17α,21-dihydroxy-1,4-pregnadiene-3,20-dione 21-diethylacetate,
9α,11β-difluoro-17α,21-dihydroxy-1,4-pregnadiene-3,20-dione 21-diethylacetate,
9α,11β-dichloro-17α,21-dihydroxy-1,4-pregnadiene-3,20-dione 21-phosphate,
9α,11β-dichloro-16α,17α-isopropylidenedioxy-21-hydroxy-1,4-pregnadiene-3,20-dione 21-phosphate,
9α,11β-difluoro-17α,21-dihydroxy-1,4-pregnadiene-3,20-dione 21-phosphate,
9α,11β-dichloro-17α,21-dihydroxy-1,4-pregnadiene-3,20-dione 21-hemisuccinate,
9α,11β-dichloro-17α,21-dihydroxy-4-pregnene-3,20-dione 21-hemisuccinate,
9α,11β-dichloro-16α,17α-isopropylidenedioxy-21-hydroxy-1,4-pregnadiene-3,20-dione 21-hemisuccinate,
9α-fluoro-11β-chloro-17α,21-dihydroxy-1,4-pregnadiene-3,20-dione 21-hemisuccinate,
9α,11β-dichloro-17α,21-dihydroxy-1,4-pregnadiene-3,20-dione 21-sodium-o-sulfobenzoate, and
9α,11β-dichloro-17α,21-dihydroxy-1,4-pregnadiene-3,20-dione 21-carbethoxylate are brominated with N-bromosuccinimide to give respectively 6β-bromo-9α-11β-dichloro-17α,21-dihydroxy-1,4-pregnadiene-3,20-dione 21-propionate,
6β-bromo-9α,11β-dichloro-16α,17α-isopropylidenedioxy-21-hydroxy-1,4-pregnadiene-3,20-dione 21-propionate,
6β-bromo-9α,11β-difluoro-17α,21-dihydroxy-1,4-pregnadiene-3,20-dione 21-propionate,
6β-bromo-9α,11β-dichloro-17α,21-dihydroxy-1,4-pregnadiene-3,20-dione 21-t-butylacetate,
6β-bromo-9α,11β-dichloro-16α,17α-isopropylidenedioxy-21-hydroxy-1,4-pregnadiene-3,20-dione 21-t-butylacetate,
6β,9α-dibromo-11β-fluoro-17α,21-dihydroxy-1,4-pregnadiene-3,20-dione 21-diethylacetate,
6β-bromo-11β-difluoro-17α,21-dihydroxy-1,4-pregnadiene-3,20-dione 21-diethylacetate,
6β-bromo-9α,11β-dichloro-17α,21-dihydroxy-1,4-pregnadiene-3,20-dione 21-phosphate,
6β-bromo-9α,11β-dichloro-16α,17α-isopropylidenedioxy-21-hydroxy-1,4-pregnadiene-3,20-dione 21-phosphate,
6β-bromo-9α,11β-difluoro-17α,21-dihydroxy-1,4-pregnadiene-3,20-dione 21-phosphate,
6β-bromo-9α,11β-dichloro-17α,21-dihydroxy-1,4-pregnadiene-3,20-dione 21-hemisuccinate,
6β-bromo-9α,11β-dichloro-17α,21-dihydroxy-4-pregnene-3,20-dione 21-hemisuccinate,
6β-bromo-9α,11β-dichloro-16α,17α-isopropylidenedioxy-21-hydroxy-1,4-pregnadiene-3,20-dione 21-hemisuccinate,
6β-bromo-9α-fluoro-11β-chloro-17α,21-dihydroxy-1,4-pregnadiene-3,20-dione 21-hemisuccinate,
6β-bromo-9α,11β-dichloro-17α,21-dihydroxy-1,4-pregnadiene-3,20-dione 21-sodium-o-sulfobenzoate, and
6β-bromo-9α,11β-dichloro-17α,21-dihydroxy-1,4-pregnadiene-3,20-dione 21-carbethoxylate.

The 6β-bromo compounds are then reacted with zinc in aqueous ethanol to give respectively 9α,11β-dichloro-17α,21-dihydroxy-1,5-pregnadiene-3,20-dione 21-propionate,
9α,11β-dichloro-16α,17α-isopropylidenedioxy-21-hydroxy-1,5-pregnadiene-3,20-dione 21-propionate,
9α,11β-difluoro-17α,21-dihydroxy-1,5-pregnadiene-3,20-dione 21-propionate,
9α,11β-dichloro-17α,21-dihydroxy-1,5-pregnadiene-3,20-dione 21-t-butylacetate,
9α,11β-dichloro-16α,17α-isopropylidenedioxy-21-hydroxy-1,5-pregnadiene-3,20-dione 21-t-butylacetate,
9α-bromo-11β-fluoro-17α,21-dihydroxy-1,5-pregnadiene-3,20-dione 21-diethylacetate,
9α,11β-difluoro-17α,21-dihydroxy-1,5-pregnadiene-3,20-dione 21-diethylacetate,
9α,11β-dichloro-17α,21-dihydroxy-1,5-pregnadiene-3,20-dione 21-phosphate,
9α,11β-dichloro-16α,17α-isopropylidenedioxy-21-hydroxy-1,5-pregnadiene-3,20-dione 21-phosphate,
9α,11β-difluoro-17α,21-dihydroxy-1,5-pregnadiene-3,20-dione 21-phosphate,
9α,11β-dichloro-17α,21-dihydroxy-1,5-pregnadiene-3,20-dione 21-hemisuccinate,
9α,11β-dichloro-17α,21-dihydroxy-5-pregnene-3,20-dione 21-hemisuccinate,
9α,11β-dichloro-16α,17α-isopropylidenedioxy-21-hydroxy-1,5-pregnadiene-3,20-dione 21-hemisuccinate,
9α-fluoro-11β-chloro-17α,21-dihydroxy-1,5-pregnadiene-3,20-dione 21-hemisuccinate,
9α,11β-dichloro-17α,21-dihydroxy-1,5-pregnadiene-3,20-dione 21-sodium-o-sulfobenzoate, and
9α,11β-dichloro-17α,21-dihydroxy-1,5-pregnadiene-3,20-dione 21-carbethoxylate.

EXAMPLE 24

*9α,11β-dihalogeno-16α,17α-alkylidenedioxy-21-hydroxy-1,4-pregnadiene-3,20-dione*

A. 9α,11β-DIHALOGENO - 16α,17α-ALKYLIDENEDIOXY-21-HYDROXY-6β-BROMO - 1,4 - PREGNADIENE-3,20-DIONE 21-ACETATE

9α-bromo-11β-fluoro-16α,17α-ethylidenedioxy-21-hydroxy-1,4-pregnadiene-3,20-dione 21-acetate,
9α,11β-dichloro-16α,17α-secondary butylidenedioxy-21-hydroxy-1,4-pregnadiene-3,20-dione 21-acetate, and
9α,11β-dichloro-16α,17α-methylenedioxy-21-hydroxy-1,4-pregnadiene-3,20-dione 21-acetate are each brominated in the manner of Example 1A to give respectively 6β,9α-dibromo-11β-fluoro-16α,17α-ethylidenedioxy-21-hydroxy-1,4-pregnadiene-3,20-dione 21-acetate,
6β-bromo-9α,11β-dichloro-16α,17α-secondary butylidenedioxy-21-hydroxy-1,4-pregnadiene-3,20-dione 21-acetate and
6β-bromo-9α,11β-dichloro-16α,17α-methylenedioxy-21-hydroxy-1,4-pregnadiene-3,20-dione 21-acetate.

B. 9α,11β-DIHALOGENO - 16α,17α-ALKYLIDENEDIOXY-21-HYDROXY-1,5-PREGNADIENE-3,20-DIONE 21-ACETATE

In the manner described in Example 1B, the 6β-bromo-1,4-pregnadiene derivatives prepared in Example 24A are each reacted with zinc in aqueous ethanol to yield respectively 9α - bromo-11β-fluoro-16α,17α-ethylidenedioxy-21-hydroxy-1,5-pregnadiene-3,20-dione 21-acetate, 9α,11β - dichloro-16α,17α-secondary butylidenedioxy-21-hydroxy-1,5-pregnadiene-3,20-dione 21-acetate and 9α,11β- dichloro - 16α,17α - methylenedioxy-21-hydroxy-1,5-pregnadiene-3,20-dione 21-acetate.

C. 9α,11β-DIHALOGENO-16α,17α-ALKYLIDENEDIOXY-21-HYDROXY-1,5-PREGNADIENE-3,20-DIONE

The 21-acetate of the 9α,11β-dihalogeno-1,5-pregnadienes prepared in Example 24B are each hydrolyzed according to the procedure of Example 1C and the resultant products isolated and purified to give 9α-bromo-11β-fluoro - 16α,17α - ethylidenedioxy-21-hydroxy-1,5-pregnadiene - 3,20-dione, 9α,11β-dichloro-16α,17α-secondary butylidenedioxy - 21-hydroxy-1,5,pregnadiene-3,20-dione, and 9α,11β-dichloro-16α,17α-methylenedioxy-21-hydroxy-1,5-pregnadiene-3,20-dione.

EXAMPLE 25

6β,16α-dimethyl-17α,21-dihydroxy-1,4,9(11)-pregnatriene-3,20-dione 21-acetate

A. 16α-METHYL-11β,17α,21-TRIHYDROXY-5-PREGNENE-3,20-DIONE 3,20-BIS-ETHYLENE KETAL

16α - methyl-11β,17α,21-trihydroxy-4-pregnene-3,20-dione (15 g.) in 1 liter of dry benzene and 390 ml. of ethylene glycol is refluxed under a Dean-Stark separator for 22 hours in the presence of 0.5 g. of p-toluenesulfonic acid. After the addition of 0.6 g. of sodium hydroxide in 20 ml. of methanol, the reaction mixture is diluted with water and the organic layer separated. The benzene layer is washed with 5% aqueous sodium carbonate and then with water and concentrated in vacuo to a residue which is crystallized from benzene-hexane to give 16α-methyl - 11β,17α,21 - trihydroxy - 5 - pregnene - 3,20-dione 3,20-bis-ethylene ketal.

In a similar manner, 16β-methyl-11β,17α,21-trihydroxy-4-pregnene-3,20-dione is reacted with ethylene glycol to give 16β - methyl - 11β,17α,21-trihydroxy - 5 - pregnene-3,20-dione 3,20-bis-ethylene ketal.

B. 5α,6α-EPOXY-16α-METHYL-11β,17α,21-TRIHYDROXY-PREGNANE-3,20-DIONE 3,20-BIS-ETHYLENE KETAL

A solution of 7.5 g. of 16α-methyl-11β,17α,21-trihydroxy-5-pregnene-3,20-dione 3,20-bis-ethylene ketal in 300 ml of chloroform containing 3 drops of pyridine is reacted with a solution of 14.9 g. of mono-perphthalic acid in 190 ml. of ether at 0° C. The mixture is allowed to stand at 0° C. for 24 hours, then diluted with ether and washed four times with 5% aqueous sodium bicarbonate and one time with water. The solution is dried over magnesium sulfate, filtered and evaporated in vacuo to a residue which is chromatographed on Florisil. The ether eluates are concentrated to a residue which is crystallized from acetone-hexane to give 5α,6α-epoxy-16α methyl - 11β,17α,21 - trihydroxypregnane - 3,20 - dione 3,20-bis-ethylene ketal.

In a similar manner, 16β - methyl - 11β,17α,21-trihydroxy-5-pregnene-3,20-dione 3,20-bis-ethylene ketal is reacted with mono-perphthalic acid according to the above procedure to give 5α,6α-epoxy-16β-methyl-11β,17α, 21-trihydroxypregnane-3,20-dione 3,20-bis-ethylene ketal.

C. 6β,16α-DIMETHYL-11β,17α,21-TRIHYDROXY-4-PREGNENE-3,20-DIONE

5α,6α - epoxy - 16α - methyl - 11β,17α,21 - trihydroxypregnane-3,20-dione 3,20-bis-ethylene ketal (3.9 g.) is dissolved in 220 ml. of tetrahydrofuran and 220 ml. of benzene and then is added to methyl magnesium iodide prepared from 5.3 g. of magnesium and 15.6 ml. of methyl iodide in 210 ml. of ether. The reaction mixture is heated to distill the ether and then refluxed for 18 hours. The aqueous amonium chloride solution is added and the organic layer separated, washed with water and concentrated. The resultant residue is dissolved in 550 ml. of acetic acid and 40 ml. of water and the solution of refluxed for 2 hours, then diluted with water and extracted with methylene chloride. The organic layer is washed to neutrality with water, dried over sodium sulfate and evaporated to a residue which is crystallized from acetone hexane to give 6β,16α-dimethyl-11β,17α,21-trihydroxy-4-pregnene-3,20-dione.

In a similar manner, 5α,6α-epoxy-16β-methyl-11β,17α, 21 - trihydroxypregnane - 3,20 - dione 3,20 - bis - ethylene ketal (prepared as described in Example 25B) is reacted with methyl magnesium iodide in the manner described above and the resultant product isolated and purified to give 6β,16β-dimethyl-11β,17α,21-trihydroxy-4-pregnene-3,20-dione.

D. 6β-16α-DIMETHYL-11β,17α,21-TRIHYDROXY-4-PREGNENE-3,20-DIONE 21-ACETATE

To 1 g. of 6β,16α-dimethyl-11β,17α,21-trihydroxy-4-pregnene-3,20-dione there is added 0.5 ml. of acetic anhydride in 2.3 ml. of pyridine. After standing for 1 hour at room temperature, the mixture is poured into ice and hydrochloric acid. The resultant precipitate is filtered and crystallized from aqueous methanol to yield 6β,16β - dimethyl - 11β,17α,21 - trihydroxy - 4 - pregnene - 3,20-dione 21-acetate.

In a similar manner, 6β,16β-dimethyl-11β,17α,21-trihydroxy-4-pregnene-3,20-dione (prepared as described in Example 25C) is esterified with acetic anhydride to give 6β,16β - dimethyl - 11β,17α,21 - trihydroxy - 4 - pregnene-3,20-dione 21-acetate.

E. 6β,16α-DIMETHYL-17α,21-DIHYDROXY-4,9(11)-PREGNADIENE-3,20-DIONE 21-ACETATE 1.5 grams of 6β,16α-dimethyl-11β,17α,21-trihydroxy-4-pregnene-3,20-dione 21-acetate are dissolved in 20 ml. of dry dimethylformamide and 4 ml. of dry pyridine. The solution is chilled in an ice bath and to it is added dropwise 2.58 g. of methanesulfonyl chloride which has been diluted to 30 ml. with dimethylformamide. After the addition has been completed, stirring is continued at room temperature for 48 hours. The reaction mixture is then poured into cold dilute sulfuric acid and the precipitated substance is filtered, air dried and crystallized from methanol to yield 6β,16α-dimethyl-17α,21-dihydroxy-4,9(11)-pregnadiene-3,20-dione 21-acetate.

In similar fashion, 6β,16β-dimethyl-11β,17α,21-trihydroxy-4-pregnene-3,20-dione 21-acetate is reacted with methanesulfonyl chloride in pyridine-dimethylformamide in the manner described above to give 6β,16β-dimethyl-17α,21-dihydroxy-4,9(11)-pregnadiene-3,20-dione 21-acetate.

F. 6β,16α-DIMETHYL-17α,21-DIHYDROXY-1,4,9(11)-PREGNATRIENE-3,20-DIONE 21-ACETATE

6β,16α - dimethyl - 17α,21 - dihydroxy - 4,9(11) - pregnadiene-3,20-dione 21-acetate is subjected to the action of a culture of Corynebacterium simplex in the following manner:

A 100 ml. broth culture containing a 0.1% yeast extract concentration, 9.0 ml. of 0.2 M KH₂PO₄ and 9.0 ml. of 0.2 M Na₂HPO₄, contained in a 300 ml. Erlenmeyer flask, is seeded with 1 ml. of a 24-hour broth culture of Corynebacterium simplex (A.T.C.C. 6946). The flask is incubated at 28° C. for 24 hours. A second 300 ml. Erlenmeyer flask containing 150 mg. of sterile 6β,16α-dimethyl - 17α,21 - dihydroxy - 4,9(11) - pregnadiene-3,20-dione 21-acetate in 5.0 ml. acetone is inoculated with the 24-hour culture of Corynebacterium simplex. The culture-containing steroid solution is incubated for 48 hours at 28–30° C.

After termination of the transformation period, the pH is 7.2–7.3. The culture is now directly extracted with 3 equal volumes of CHCl₃, the solvent volumes combined and concentrated on a steam bath to a residue which is crystallized from acetone-hexane to give 6β,16α-dimethyl-17α,21 - dihydroxy - 1,4,9(11) - pregnatriene - 3,20 - dione 21-acetate.

Similarly, 6β,16β-dimethyl-17α,21-dihydroxy-4,9(11)-pregnadiene-3,20-dione 21-acetate is oxidized by means of Corynebacterium simplex in the manner described above to give 6β,16β-dimethyl-17α,21-dihydroxy-1,4, 9(11)-pregnatriene-3,20-dione 21-acetate.

EXAMPLE 26

*6,16-dimethyl-9α,11β-dichloro-17α,21-dihydroxy-1,4-pregnadiene-3,20-dione 21-acetate*

A. 6β,16α - DIMETHYL - 9α,11β - DICHLORO - 17α,21-DIHYDROXY-1,4-PREGNADIENE-3,20-DIONE 21-ACETATE 0.7 grams of 6β,16α-dimethyl-17α,21-dihydroxy-1,4,9(11)-pregnatriene-3,20-dione 21-acetate (prepared as described in Example 25F) is dissolved in 30 ml. of carbon tetrachloride and 0.6 ml. of pyridine and there is added at −20° C. a solution of 210 mg. of chlorine in 3.5 ml. of carbon tetrachloride. The mixture is stirred at −20° C. for 15 minutes, then allowed to warm to room temperature over a period of one-half hour. The solution is filtered and the filtrate concentrated in vacuo to a residue which is crystallized from acetone to give 6β,16α - dimethyl - 9α,11β - dichloro - 17α,21 - dihydroxy-1,4-pregnadiene-3,20-dione 21-acetate.

In a similar manner, 6β,16α-dimethyl-17α,21-dihydroxy-4,9(11)-pregnadiene-3,20-dione 21-acetate (the compound of Example 25E) is chlorinated with chlorine in carbon tetrachloride and pyridine to give 6β,16α-dimethyl - 9α,11β - dichloro - 17α,21 - dihydroxy - 4 - pregnene-3,20-dione 21-acetate.

B. 6α,16α - DIMETHYL - 9α,11β - DICHLORO - 17α,21 - DIHYDROXY-1,4-PREGNADIENE-3,20-DIONE 21-ACETATE

To a solution of 0.2 g. of 6β,16α-dimethyl-17α,21-dihydroxy - 1,4,9(11) - pregnatriene - 3,20 - dione 21 - acetate (the compound of Example 25F) and 5 g. of lithium chloride in 40 ml. of glacial acetic acid is added 0.41 g. of N-chlorosuccinimide, followed by 0.104 g. of anhydrous hydrogen chloride dissolved in 2.5 ml. of tetrahydrofuran. The reaction mixture is stirred for 2 hours, then poured into ice water. A solid results which is filtered, washed with water and recrystallized from acetone-hexane to give 6α,16α-dimethyl-9α,11β-dichloro-17α,21-dihydroxy-1,4-pregnadiene-3,20-dione 21-acetate.

In a similar manner, 6β,16α-dimethyl-17α,21-dihydroxy-4,9(11)-pregnadiene-3,20-dione 21-acetate (the compound of Example 25E) is chlorinated with N-chlorosuccinimide with lithium chloride in glacial acetic acid in the manner described above and the resultant product isolated and purified to give 6α,16α-dimethyl-9α,11β-dichloro-17α,21-dihydroxy-4-pregnene - 3,20 - dione 21-acetate.

C. 6β,16β - DIMETHYL - 9α,11β - DICHLORO - 17α,21 - DIHYDROXY-1,4-PREGNADIENE-3,20-DIONE 21-ACETATE

6β,16β - dimethyl - 17α,21 - dihydroxy - 1,4,9(11)-pregnatriene-3,20-dione 21-acetate (prepared in the manner described in Example 25F) is reacted with chlorine in carbon tetrachloride and pyridine in the manner described in Example 26A and the resultant product isolated and purified to give 6β,16β-dimethyl-9α,11β-dichloro - 17α,21 - dihydroxy - 1,4 - pregnadiene - 3,20-dione 21-acetate.

In a similar manner, 6β,16β-dimethyl-17α,21-dihydroxy-4,9(11)-pregnadiene-3,20-dione 21-acetate (prepared as described in Example 25E) is chlorinated in the above described manner to give 6β,16β-dimethyl-9α,11β-dichloro-17α,21-dihydroxy-4-pregnene-3,20-dione 21-acetate.

D. 6α,16β - DIMETHYL - 9α,11β-DICHLORO - 17α,21-DIHYDROXY-1,4-PREGNADIENE-3,20-DIONE 21-ACETATE

In the manner described in Example 26B, 6β,16β-dimethyl - 17α,21 - dihydroxy-1,4,9(11)-pregnatriene-3,20-dione 21-acetate (prepared as described in Example 25F) is chlorinated with N-chlorosuccinimide and hydrogen chloride in glacial acetic acid and the resultant product isolated and purified to give 6α,16β-dimethyl-9α,11β-dichloro-17α,21-dihydroxy-1,4-pregnadiene-3,20-dione 21-acetate.

In a similar manner, 6β,16β-dimethyl-17α,21-dihydroxy-4,9(11)-pregnadiene-3,20-dione 21-acetate (prepared as described in Example 25E) is chlorinated in the above described manner to give 6α,16β-dimethyl-9α,11β-dichloro-17α,21-dihydroxy-4-pregnene-3,20-dione 21-acetate.

EXAMPLE 27

*6,16α-dimethyl-9α,11β-dichloro-17α,21-dihydroxy-1,5-pregnadiene-3,20-dione*

A. 6-BROMO-9α,11β-DICHLORO-6,16α - DIMETHYL - 17α,21-DIHYDROXY-1,4-PREGNADIENE-3,20-DIONE 21-ACETATE

In the manner described in Example 1A, 6β,16α-dimethyl - 9α,11β - dichloro-17α,21-dihydroxy-1,4-pregnadiene-3,20-dione 21-acetate (the compound of Example 26A) is reacted with N-bromosuccinimide in chlorobenzene and carbon tetrachloride and the resultant product isolated and purified to give 6-bromo-9α,11β-dichloro-6,16α - dimethyl - 17α,21-dihydroxy-1,4-pregnadiene-3,20-dione 21-acetate.

B. 6,16α - DIMETHYL - 9α,11β - DICHLORO - 17α,21 - DIHYDROXY-1,5-PREGNADIENE-3,20-DIONE 21-ACETATE

In the manner described in Example 1B, 6-bromo-9α,11β - dichloro - 6,16α - dimethyl-17α,21-dihydroxy-1,4-pregnadiene-3,20-dione 21-acetate (prepared as described in Example 27A) is reacted with zinc in aqueous ethanol and the resultant product isolated and purified to give 6,16α - dimethyl - 9α,11β-dichloro-17α,21-dihydroxy-1,5-pregnadiene-3,20-dione 21-acetate.

Alternatively, 6α,16α-dimethyl-9α,11β-dichloro-17α,21-dihydroxy - 1,4-pregnadiene-3,20-dione 21-acetate (prepared according to the procedure of Example 26B) is brominated with N-bromosuccinimide in the manner of Example 1A to give an intermediate, 6-bromo-9α,11β-dichloro - 6,16α-dimethyl-17α,21-dihydroxy-1,4-pregnadiene-3,20-dione 21-acetate, which when reacted with zinc in aqueous ethanol in the above described manner yields the compound of this example, 6,16α-dimethyl-9α,11β-dichloro-17α,21-dihydroxy-1,5-pregnadiene-3,20-dione 21-acetate.

C. 6,16α - DIMETHYL - 9α,11β - DICHLORO - 17α,21 - DIHYDROXY-1,5-PREGNADIENE-3,20-DIONE 6,16α - dimethyl-9α,11β-dichloro-17α,21-dihydroxy-1,5-pregnadiene-3,20-dione 21-acetate is hydrolyzed with the aid of *Flavobacterium dehydrogenans* in the manner described in Example 1C to give 6,16α-dimethyl-9α,11β-dichloro-17α,21-dihydroxy-1,5-pregnadiene-3,20-dione.

EXAMPLE 28

*6,16β-dimethyl-9α,11β-dichloro-17α,21-dihydroxy-1,5-pregnadiene-3,20-dione*

Going through the sequence of reactions outlined in Example 27, 6β,16β - dimethyl-9α,11β-dichloro-17α,21-dihydroxy - 1,4 - pregnadiene-3,20-dione 21-acetate (the compound of Example 26C) is brominated to give 6-bromo - 9α,11β - dichloro - 6,16β - dimethyl-17α,21-dihydroxy-1,4-pregnadiene-3,20-dione 21-acetate which, in turn, is reacted with zinc in aqueous ethanol to give 6,16β-dimethyl - 9α,11β-dichloro-17α,21-dihydroxy-1,5-pregnadiene-3,20-dione 21-acetate. The 21-acetate is hydrolyzed to the corresponding 21-alcohol with the aid of a culture of *Flavobacterium dehydrogenans* to give 6,16β-dimethyl-9α,11β - dichloro-17α,21-dihydroxy-1,5-pregnadiene-3,20-dione.

EXAMPLE 29

*6,16-dimethyl-9α,11β-dichloro-17α,21-dihydroxy-5-pregnene-3,20-dione*

By going through the sequence of reactions outlined in Example 27, 6β,16α-dimethyl-9α,11β-dichloro-17α,21-dihydroxy-4-pregnene-3,20-dione 21-acetate, and 6α,16α-dimethyl - 9α,11β - dichloro - 17α,21-dihydroxy-4-pregnene-3,20-dione 21-acetate, are each reacted with N-bromosuccinimide to give the 6-bromo intermediates, 6-bromo-9α,11β - dichloro - 6,16α - dimethyl - 17α,21-dihydroxy-4-pregnene-3,20-dione 21-acetate each of which, when reacted with zinc in aqueous ethanol in the manner of Example 1B yields the compound 6,16α-dimethyl-9α,11β-dichloro-17α,21-dihydroxy-5-pregnene-3,20-dione 21-acetate. The 21-acetate is then hydrolyzed by means of *Flavobacterium dehydrogenans* to give 6,16-dimethyl-9α,11β - dichloro - 17α,21 - dihydroxy - 5-pregnene-3,20-dione.

EXAMPLE 30

*6,16-dimethyl-9α,11β-difluoro-17α,21-dihydroxy-1,5-pregnadiene-3,20-dione*

A. 6β,16 - DIMETHYL - 9α,11β - DIFLUORO - 17α,21 - DIHYDROXY-1,4-PREGNADIENE-3,20-DIONE 21-ACETATE

One gram of 6β,16α - dimethyl - 17α,21 - dihydroxy-1,4,9(11)-pregnatriene-3,20-dione 21-acetaate (the compound of Example 25) is dissolved in 40 ml. of chloroform, chilled to −30° C. in a Dry Ice acetone bath and there is then added with stirring 700 mg. of lead tetrafluoride. The mixture is stirred in the cold for 18 hours, then filtered. The filtrate is evaporated to a residue which is chromatographed on magnesium silicate. The material eluted with 60% ether-in-hexane to 100% ether is combined and crystallized from acetone-hexane to give 6β,16α-dimethyl - 9α,11β-difluoro-17α,21-dihydroxy-1,4-pregnadiene-3,20-dione 21-acetate.

In a similar manner, 6,16β-dimethyl-17α,21-dihydroxy-1,4,9(11)-pregnatriene-3,20-dione 21-acetate (prepared as described in Example 25) is reacted with lead tetrafluoride in the manner described above to give 6β,16β-dimethyl - 9α,11β-difluoro-17α,21-dihydroxy-1,4-pregnadiene-3,20-dione 21-acetate.

B. 6-BROMO - 9α,11β - DIFLUORO-6,16 - DIMETHYL-17α,21-DIHYDROXY-1,4-PREGNADIENE - 3,20 - DIONE 21-ACETATE

In a manner similar to that described in Example 1A, 6β,16-dimethyl - 9α,11β - difluoro - 17α,21 - dihydroxy-1,4-pregnadiene-3,20-dione 21-acetate and 6β,16β-dimethyl-9α,11β-difluoro - 17α,21 - dihydroxy-1,4 - pregnadiene-3,20-dione 21-acetate are each brominated with N-bromosuccinimide and the resultant products isolated and purified in the described manner to give respectively 6-bromo-9α,11β-difluoro - 6,16α-dimethyl-17α,21 - dihydroxy - 1,4-pregnadiene-3,20-dione 21-acetate and 6-bromo-9α,11β-difluoro - 6,16β - dimethyl - 17α,21 - dihydroxy-1,4-pregnadiene-3,20-dione 21-acetate.

C. 6,16 - DIMETHYL - 9α,11β - DIFLUORO - 17α,21 - DIHYDROXY-1,5-PREGNADIENE-3,20-DIONE 21-ACETATE 6-bromo - 9α,11β - difluoro - 6,16α-dimethyl-17α,21-dihydroxy - 1,4 - pregnadiene - 3,20-dione 21-acetate and 6 - bromo - 9α,11β - difluoro - 6,16β-dimethyl-17α,21-dihydroxy-1,4-pregnadiene-3,20-dione 21-acetate are each reacted with zinc in aqueous ethanol in the manner of Example 1B and the resultant products isolated and purified in the described manner to give respectively 6,16α-dimethyl - 9α,11β - difluoro - 17α,21-dihydroxy-1,5-pregnadiene-3,20-dione 21-acetate and 6,16β-dimethyl-9α,11β-difluoro-17α,21-dihydroxy-1,5-pregnadiene-3,20-dione 21-acetate.

D. 6,16 - DIMETHYL - 9α,11β - DIFLUORO - 17α,21 - DIHYDROXY-1,5-PREGNADIENE-3,20-DIONE

In the manner described in Example 1C, the 21-acetate of the 9α,11β-difluoro-1,5-pregnadienes prepared in Example 30C are subjected to the action of *Flavobacterium dehydrogenans* and the resultant products isolated and purified to give respectively 6,16α-dimethyl-9α,11β-difluoro-17α,21-dihydroxy-1,5-pregnadiene-3,20-dione and 6,16β-dimethyl-9α,11β - difluoro - 17α,21 - dihydroxy - 1,5-pregnadiene-3,20-dione.

EXAMPLE 31

*6,16-dimethyl-9α-bromo-11β-fluoro-17α,21-dihydroxy-1,5-pregnadiene-3,20-dione 21-acetate*

A. 6,16-DIMETHYL-9α-BROMO-11β-FLUORO - 17α,21-DIHYDROXY-1,4-PREGNADIENE-3,20-DIONE 21-ACETATE

To a solution of 110 mg. of 6β,16α-dimethyl-17α,21-dihydroxy - 1,4,9(11)-pregnatriene - 3,20-dione 21-acetate (the compound of Example 25) in 20 ml. of carbon tetrachloride and 2 ml. of pyridine, there is added a solution of 250 mg. of hydrogen fluoride in 2 ml. of a chloroform-tetrahydrofuran mixture (1:2), followed by 220 mg. of N-bromoacetamide. The reaction mixture is diluted with sufficient methylene chloride to give a solution and is stirred for 48 hours at room temperature. The reaction mixture is then poured into aqueous sodium carbonate and extracted with methylene chloride. The organic extracts are combined, washed with water, dilute hydrochloric acid and finally with water. The solution is then dried over magnesium sulfate, filtered and evaporated to a residue which is dissolved in acetone-ether and filtered through a column of Florisil in ether. The eluates are combined, the ether distilled in vacuo and the resultant residue crystallized from methylene chloride-pentane to give 6,16α-dimethyl - 9α - bromo-11β-fluoro-17α,21-dihydroxy-1,4-pregnadiene-3,20-dione 21-acetate.

Similarly, 6β,16β-dimethyl-17α,21-dihydroxy-1,4,9(11)-pregnatriene-3,20-dione 21-acetate (prepared as described in Example 25) is reacted with N-bromoacetamide and hydrogen fluoride in the above manner to give 6,16β-dimethyl-9α-bromo - 11β - fluoro - 17α,21 - dihydroxy - 1,4-pregnadiene-3,20-dione 21-acetate.

B. 6,16 - DIMETHYL-9α - BROMO - 11β - FLUORO - 17α,21-DIHYDROXY-1,5-PREGNADIENE-3,20-DIONE

By going through the sequence of reactions in procedures 1A, 1B and 1C, 6,16α-dimethyl-9α-bromo-11β-fluoro-17α,21-dihydroxy-1,4-pregnadiene - 3,20 - dione 21-acetate and 6,16β-dimethyl-9α-bromo-11β-fluoro-17α,21-dihydroxy-1,4-pregnadiene-3,20-dione 21-acetate are each brominated with N-bromosuccinimide to give respectively 6,9α-dibromo-11β-fluoro-6,16α-dimethyl - 17α,21 - dihydroxy-1,4-pregnadiene-3,20-dione 21-acetate and 6,9α-dibromo-11β-fluoro-6,16β-dimethyl-17α,21-dihydroxy-1,4-pregnadiene-3,20-dione 21-acetate which, in turn, are each reacted with zinc in aqueous ethanol to give respectively 6,16α-dimethyl-9α-bromo-11β-fluoro - 17α,21 - dihydroxy-1,5-pregnadiene-3,20-dione 21-acetate and 6,16β-dimethyl-9α - bromo-11β-fluoro-17α,21-dihydroxy-1,5-pregnadiene-3,20-dione 21-acetate. Hydrolysis of the 21-acetate of the aforementioned compounds by means of *Flavobacterium dehydrogenans* yields respectively 6,16α-dimethyl-9α-bromo - 11β-fluoro-17α,21-dihydroxy-1,5-pregnadiene-3,20-dione and 6,16β-dimethyl-9α-bromo-11β-fluoro17α,21-dihydroxy-1,5-pregnadiene-3,20-dione.

EXAMPLE 32

*Preparation of 9α,11β-dihalogeno derivatives of 16α,17α,21-trihydroxy-5-pregnenes and 16α,17α21-trihydroxy-1,5-pregnadienes*

According to the sequence of reactions outlined in Example 1, 6α-methyl-9α-chloro-11β-fluoro-16α,17α,21-trihydroxy 1,4-pregnadiene-3,20-dione 21-acetate, 2α-methyl-9α-chloro-11β-fluoro - 16α,17α,21 - trihydroxy-4-pregnene-3,20-dione 21-acetate, 9α,11β-dichloro-16α,17α,21-trihydroxy-1-4-pregnadiene-3,20-dione 21-acetate, 9α-bromo-11β-fluoro-16α,17α,21 - trihydroxy - 1,4-pregnadiene-3,20-dione 21-acetate, and 6α-methyl-9α,11β-dichloro-16α,17α,21-trihydroxy-1-4-pregnadiene-3,20-dione 21-acetate are each brominated with N-bromosuccinimide to yield respectively 6-methyl-6-bromo-9α-chloro - 11β - fluoro-16α,17α,21-trihydroxy-1,4-pregnadiene-3,20-dione 21-acetate, 2α-methyl - 6β - bromo-9α-chloro-11β-fluoro-16α,17α,21-trihydroxy-4-pregnene-3,20-dione 21-acetate, 6β-bromo-9α,11β-dichloro - 16α,17α,21-trihydroxy-1,4-pregnadiene-3,20-dione 21-acetate, 6β,9α-dibromo-11β-fluoro-16α,17α,21-trihydroxy-1,4-pregnadiene-3,20-dione 21-acetate, and 6-methyl-6-bromo-9α,11β-dichloro-16α,17α,21-trihydroxy-1,4-pregnadiene-3,20-dione 21-acetate, which, in turn, are each reacted with zinc in aqueous ethanol to give respectively 6 - methyl - 9α - chloro-11β-fluoro-16α,17α,21-trihydroxy-1,5-pregnadiene-3,20-dione 21-acetate, 2α-methyl- 9α-chloro-11β-fluoro-16α,17α,21-trihydroxy-5-pregnene-3,20-dione 21-acetate, 9α,11β-dichloro-16α,17α,21-trihydroxy-1,5-pregnadiene-3,20-dione 21-acetate, 9α-bromo-11β-fluoro-16α,17α,21-trihydroxy-1,5-pregnadiene-3,20-dione 21-acetate, and 6α-methyl-9α,11β-dichloro-16α,17α,21-trihydroxy-1,5-pregnadiene-3,20-dione 21-acetate. The 21-acetate of each of the aforementioned compounds are hydrolyzed by means of *Flavobacterium dehydrogenans* to give respectively 6-methyl-9α-chloro-11β-fluoro-16α,17α,21-trihydroxy-1,5-pregnadiene-3,20-dione, 2α-methyl-9α-chloro-11β-fluoro-16α,17α,21-trihydroxy-5-pregnene-3,20-dione, 9α,11β-dichloro-16α,17α,21-trihydroxy-1,5-pregnadiene-3,20-dione, 9α-bromo-11β-fluoro-16α,17α,21-trihydroxy-1,5-pregnadiene-3,20-dione and 6α-methyl-9α,11β-dichloro-16α,17α,21-trihydroxy-1,5-pregnadiene-3,20-dione.

EXAMPLE 33

*The preparation for 2-methyl-9α,11β-dihalogeno-1,5-pregnadienes*

A. PREPARATION OF 2-METHYL-9α,11β-DIHALOGENO-1,4-PREGNADIENES

2α-methyl-9α,11β-dichloro-17α,21-dihydroxy-4-pregnene-3,20-dione 21-acetate, 2α-methyl-9α-chloro-11β-fluoro-17α,21-dihydroxy-4-pregnene-3,20-dione 21-acetate, 2α-methyl-9α,11β-difluoro-17α,21-dihydroxy-4-pregnene-3,20-dione 21-acetate, 2α-methyl-9α-chloro-11β-fluoro-16α,17α-isopropylidenedioxy-21-hydroxy-4-pregnene-3,20-dione 21-acetate, and 2α-methyl-9α-chloro-11β-fluoro-16α,17α,21-trihydroxy-4-pregnene-3,20-dione 21-acetate are each subjected to the action of a culture of the organism *Corynebacterium simplex* in the manner described in Example 25F to yield respectively 2-methyl-9α,11β-dichloro-17α,21-dihydroxy-1,4-pregnadiene-3,20-dione 21-acetate, 2-methyl-9α-chloro-11β-fluoro-17α,21-dihydroxy-1,4-pregnadiene-3,20-dione 21-acetate, 2-methyl-9α,11β-dichloro-17α,21-dihydroxy-1,4-pregnadiene-3,20-dione 21-acetate, 2-methyl-9α-chloro-11β-fluoro-16α,17α-isopropylidenedioxy-21-hydroxy-1,4-pregnadiene-3,20-dione 21-acetate, and 2-methyl-9α-chloro-11β-fluoro-16α,17α,21-trihydroxy-1,4-pregnadiene-3,20-dione 21-acetate.

B. 2-METHYL-9α,11β-DIHALOGENO DERIVATIVES OF 1,5-PREGNADIENES

By going through the sequence of reactions outlined in Example 1, the 2-methyl-9α,11β-dihalogeno-1,4-pregnadienes prepared in Example 33A are each brominated with N-bromosuccinimide to give respectively 2-methyl-6β-bromo-9α,11β-dichloro-17α,21-dihydroxy-1,4-pregnadiene-3,20-dione 21-acetate, 2-methyl-6β-bromo-9α-chloro-11β-fluoro-17α,21-dihydroxy-1,4-pregnadiene-3,20-dione 21-acetate, 2-methyl-6β-bromo-9α,11β-difluoro-17α,21-dihydroxy-1,4-pregnadiene-3,20-dione 21-acetate, 2-methyl-6β-bromo-9α-chloro-11β-fluoro-16α,17α-isopropylidenedioxy-21-hydroxy-1,4-pregnadiene-3,20-dione 21-acetate, and 2-methyl-6β-bromo-9α-chloro-11β-fluoro-16α,17α,21-trihydroxy-1,4-pregnadiene-3,20-dione 21-acetate which, in turn, are each reacted with zinc in aqueous ethanol to give respectively 2-methyl-9α,11β-dichloro-17α,21-dihydroxy-1,5-pregnadiene-3,20-dione 21-acetate, 2-methyl-9α-chloro-11β-fluoro-17α,21-dihydroxy-1,5-pregnadiene-3,20-dione 21-acetate, 2-methyl-9α,11β-difluoro-17α,21-dihydroxy-1,5-pregnadiene-3,20-dione 21-acetate, 2-methyl-9α-chloro-11β-fluoro-16α,17α-isopropylidene-dioxy-21-hydroxy-1,5-pregnadiene-3,20-dione 21-acetate, and 2-methyl-9α-chloro-11β-fluoro-16α,17α,21-trihydroxy-1,5-pregnadiene-3,20-dione 21-acetate. The 21-acetate of the aforementioned compounds are then converted to their corresponding 21-alcohols with the aid of a culture of *Flavobacterium dehydrogenans* to give respectively 2-methyl-9α,11β-dichloro-17α,21-dihydroxy-1,5-pregnadiene-3,20-dione, 2-methyl-9α-chloro-11β-fluoro-17α,21-dihydroxy-1,5-pregnadiene-3,20-dione, 2-methyl-9α,11β-difluoro-17α,21-dihydroxy-1,5-pregnadiene-3,20-dione, 2-methyl-9α-chloro-11β-fluoro-16α,17α-isopropylidenedioxy-21-hydroxy-1,5-pregnadiene-3,20-dione and 2-methyl-9α-chloro-11β-fluoro-16α,17α,21-trihydroxy-1,5-pregnadiene-3,20-dione.

EXAMPLE 34

*6-methyl-9α,11β-dichloro-17α,21-dihydroxy-5-pregnene-3,20-dione*

A. 6α-METHYL-17α,21-DIHYDROXY-4,9(11)-PREGNADIENE-3,20-DIONE 21-ACETATE

Five grams of 6α-methyl-11β,17α,21-trihydroxy-4-pregnene-3,20-dione 21-acetate are dissolved in 20 ml. of dry dimethylformamide and 4 ml. of dry pyridine. The solution is chilled in an ice bath and to it is added dropwise 3.05 g. of methanesulfonyl chloride which has been diluted to 30 ml. with dimethylformamide. After the addition has been completed, stirring is continued at room temperature for 48 hours. The reaction mixture is then poured into cold dilute sulfuric acid and the precipitated substance is filtered, air dried and crystallized from methanol to yield 6α-methyl-17α,21-dihydroxy-4,9(11)-pregnadiene-3,20-dione 21-acetate.

B. 6α-METHYL-9α,11β-DICHLORO-17α,21-DIHYDROXY-4-PREGNENE-3,20-DIONE 21-ACETATE

In the manner described in Example 26B, 6α-methyl-17α,21-dihydroxy-4,9(11)-pregnadiene-3,20-dione 21-acetate is reacted with lithium chloride, N-chlorosuccinimide, and hydrogen chloride in glacial acetic acid and the resultant product isolated and purified to give 6α-methyl-9α,11β-dichloro-17α,21-dihydroxy-4-pregnene-3,20-dione 21-acetate.

C. 6-METHYL-9α,11β-DICHLORO-17α,21-DIHYDROXY-5-PREGNENE-3,20-DIONE

According to the sequence of reactions outlined in Example 1, 6α-methyl-9α,11β-dichloro-17α,21-dihydroxy-4-pregnene-3,20-dione 21-acetate is brominated with N-bromosuccinimide to give 6-methyl-6-bromo-9α,11β-dichloro-17α,21-dihydroxy-4-pregnene-3,20-dione 21-acetate which, in turn, is reacted with zinc in aqueous ethanol to give 6-methyl-9α,11β-dichloro-17α,21-dihydroxy-5-pregnene-3,20-dione 21-acetate. The 21-acetate upon hydrolysis with *Flavobacterium dehydrogenans* yields the corresponding 21-alcohol, 6-methyl-9α,11β-dichloro-17α,21-dihydroxy-5-pregnene-3,20-dione.

EXAMPLE 35

*9α-iodo-11β-fluoro-16-methyl-17α,21-dihydroxy-1,5-pregnadiene-3,20-dione*

A. 9α-IODO-11β-FLUORO-16-METHYL-17α,21-DIHYDROXY-1,4-PREGNADIENE-3,20-DIONE 21-ACETATE

To a solution of 550 mg. of 16α-methyl-17α,21-dihydroxy-1,4,9(11)-pregnatriene-3,20-dione 21-acetate and 3.0 g. of potassium fluoride in 40 ml. of dimethylsulfoxide there is added 300 mg. of N-iodosuccinimide. The reaction mixture is stirred at room temperature for 16 hours, poured into ice-water, and extracted with methylene chloride. The organic extracts are then treated with decolorizing carbon, and concentrated in vacuo. The resultant residue is chromatographed on silica gel, the fraction eluted with 50% ether-hexane yielding 9α-iodo-11β-fluoro-16α-methyl-17α,21-dihydroxy-1,4-pregnadiene-3,20-dione 21-acetate.

Similarly, 16β-methyl-17α,21-dihydroxy-1,4,9(11)-pregnatriene-3,20-dione 21-acetate is reacted with potassium fluoride and N-iodosuccinimide to give 9α-iodo-11β-fluoro-16β-methyl-17α,21-dihydroxy-1,4-pregnadiene-3,20-dione 21-acetate.

B. 9α-IODO-11β-FLUORO-16-METHYL-17α,21-DIHYDROXY-1,4-PREGNADIENE-3,20-DIONE

A solution of 2.5 g. of 9α-iodo-11β-fluoro-16α-methyl-17α,21-dihydroxy-1,4-pregnadiene-3,20-dione 21-acetate in 100 ml. of a 3:1 methanol-chloroform mixture is chilled in ice, to which is added dropwise 52 ml. of 0.1 N-sodium hydroxide solution (1 equivalent). The reaction mixture is stirred at 0° C. for 10 minutes, then diluted with water and extracted with methylene chloride. Evaporation of the solvent and crystallization of the residue from acetone-hexane affords 9α-iodo-11β-fluoro-16α-methyl - 17α,21 - dihydroxy-1,4-pregnadiene-3,20-dione.

9α-iodo-11β-fluoro-16β-methyl-17α,21-dihydroxy - 1,4-pregnadiene-3,20-dione 21-acetate is hydrolyzed in the above described manner to give 9α-iodo-11β-fluoro-16β-methyl-17α,21-dihydroxy-1,4-pregnadiene-3,20-dione.

C. 9α-IODO-11β-FLUORO-16-METHYL-6β,17α,21-TRI-HYDROXY-1,4-PREGNADIENE-3,20-DIONE

Into each of ten 300 ml. Erlenmeyer flasks is placed 100 ml. of a growth medium having the following composition:

| | G. |
|---|---|
| Difco yeast extract | 3-10 |
| Corn steep liquor | 1 |
| Dextrose | 10 |
| Distilled or tap water, q.s. to one liter | |

Each flask is inoculated with spores from an agar medium culture of *Chaetomium funicolum* (QM No. 33C) or with a 1-10% submerged inoculum which has been grown for 24-48 hours. The mixture is incubated by shaking the flasks on a rotary shaker for 24-48 hours at 28° C. at approximately 250 r.p.m. To each of the flasks (now showing prolific growth) is added, aseptically, 50 mg. of 9α-iodo-11β-fluoro-16α-methyl-17α,21-dihydroxy-1,4-pregnadiene-3,20-dione in 2 ml. of ethanol. The fermentation mixture is then incubated and shaken for 24-72 hours at 28° C. after which time complete conversion occurs. The mixture is extracted thoroughly with chloroform and the small fraction of the product which is retained within the mycelium is extracted by boiling the mycelium in chloroform for a few minutes. The chloroform extracts are combined and evaporated to a residue yielding approximately 5 mg. of crude material. The residue is triturated with methanol affording a crystalline solid which is purified by crystallization from acetone yielding 9α-iodo-11β-fluoro-16α-methyl-6β,17α,21-trihydroxy-1,4-pregnadiene-3,20-dione.

In a similar manner, 9α-iodo-11β-fluoro-16β-methyl-17α,-21-dihydroxy-14-pregnadiene-3,20-dione is subjected to the action of *Chaetomium funicolum* to give 9α-iodo-11β - fluoro-16β-methyl-6β,17α,21-trihydroxy-1,4-pregnadiene-3,20-dione.

D. 9α-IODO-11β - FLUORO - 16 - METHYL-6β,17α,21-TRIHYDROXY - 1,4 - PREGNADIENE - 3,20 - DIONE 6,21-DIACETATE

A solution of 25 mg. of 9α-iodo-11β-fluoro-16α-methyl-6β,17α,21-trihydroxy-1,4-pregnadiene-3,20-dione in 2 ml. of anhydrous pyridine is poured into 100 mg. of acetic anhydride in an anhydrous atmosphere. The mixture is stirred for 30 minutes then poured into dilute sulfuric acid and ice. The resultant precipitate is removed by filtration, dried and crystallized from methanol yielding 9α - iodo-11β-fluoro-16α-methyl-6β,17α,21-trihydroxy-1,4-pregnadiene-3,20-dione 6,21-diacetate.

In a similar manner, the 16β-methyl triol prepared as described in Example 35C is esterified in the above manner to give 9α-iodo-11β-fluoro-16β-methyl-6β,17α,21-trihydroxy-1,4-pregnadiene-3,20-dione 6,21-diacetate.

E. 9α-IODO-11β-FLUORO-16-METHYL-17α,21-DIHYDROXY-1,5-PREGNADIENE-3,20-DIONE 21-ACETATE

9α-iodo-11β-fluoro-16α-methyl - 6β,17α,21 - trihydroxy-1,4-pregnadiene-3,20-dione 6,21-diacetate (30 mg.) is dissolved in 20 ml. of ethanol and 1 ml. of water. Zinc filings (100 mg.) are added and the suspension stirred for one hour at 90° C. The solution is cooled, the zinc filtered, and the resulting filtrate concentrated to a residue substantially of 9α-iodo-11β-fluoro-16α-methyl-17α,21-dihydroxy-1,5-pregnadiene-3,20-dione 21-acetate.

In a similar manner, 9α-iodo-11β-fluoro-16β-methyl-6β,17α,21-trihydroxy-1,4-pregnadiene-3,20 - dione 6,21-diacetate is reacted with zinc in aqueous ethanol to give 9α-iodo-11β-fluoro-16β-methyl - 17α,21 - dihydroxy - 1,5-pregnadiene-3,20-dione 21-acetate.

F. 9α-IODO-11β-FLUORO-16-METHYL-17α,21-DIHYDROXY-1,5-PREGNADIENE-3,20-DIONE

In the manner described in Example 1C, 9α-iodo-11β-fluoro-16α-methyl-17α,21 - dihydroxy - 1,5 - pregnadiene-3,20-dione 21-acetate and 9α-iodo-11β-fluoro-16β-methyl-17α,21-dihydroxy-1,5-pregnadiene-3,20-dione 21 - acetate are each reacted with *Flavobacterium dehydrogenans* and the resultant products isolated to give respectively 9α-iodo-11β-fluoro-16α-methyl-17α,21 - dihydroxy - 1,5-pregnadiene-3,20-dione and 9α-iodo-11β-fluoro - 16β - methyl-17α,21-dihydroxy-1,5-pregnadiene-3,20-dione.

Alternatively, the compound of this example may be prepared as described in following procedures G, H and I.

G. 9α-IODO-11β-FLUORO - 16 - METHYL - 6β,17α,21-TRIHYDROXY-1,4-PREGNADIENE-3,20-DIONE 21-ACETATE

A solution of 25 mg. of 9α-iodo-11β-fluoro-16α-methyl-6β,17α,21-trihydroxy-1,4-pregnadiene - 3,20 - dione (prepared as described in Example 35C) in 2 ml. of anhydrous pyridine is poured into 6 ml. of acetic anhydride in a nitrogen atmosphere. The mixture is stirred for 30 minutes then poured into dilute sulfuric acid and ice. The resultant precipitate is removed by filtration, dried and crystallized from methanol yielding 9α-iodo-11β-fluoro-16α-methyl-6β,17α,21-trihydroxy-1,4 - pregnadiene-3,20-dione 21-acetate.

Similarly, 9α-iodo-11β-fluoro-16β-methyl-6β,17α,21-trihydroxy-1,4-pregnadiene-3,20-dione (prepared as described in Example 35C) is reacted in the above manner to give 9α-iodo-11β-fluoro-16β-methyl - 6β,17α,21 - trihydroxy-1,4-pregnadiene-3,20-dione 21-acetate.

H. 9α-IODO-11β-FLUORO - 16 - METHYL - 6β,17α,21-TRIHYDROXY - 1,4 - PREGNADIENE-3,20-DIONE 6 - METHANESULFONATE 21-ACETATE 75 mg. of 9α-iodo-11β-fluoro-16α-methyl-6β,17α,21-trihydroxy-1,4-pregnadiene - 3,20 - dione 21 - acetate is dissolved in 0.4 ml. of methylene chloride and 0.4 ml. of pyridine. The solution is cooled to 0° C. and 1.6 ml. of methanesulfonyl chloride is added. After stirring for two hours at 0° C., the mixture is left overnight at room temperature. The reaction mixture is then poured into water and the resultant precipitate is filtered and air dried to give 9α-iodo-11β-fluoro-16α-methyl-6β,17α-21-trihydroxy-1,4-pregnadiene-3,20-dione 6 - methanesulfonate 21 - acetate.

In a similar manner, 9α-iodo-11β-fluoro-16β-methyl-6β,17α,21-trihydroxy-1,4-pregnadiene-3,20 - dione 21-acetate is reacted with methanesulfonyl chloride in the above manner to give 9α-iodo-11β-fluoro-16β-methyl-6β,17α,21-trihydroxy-1,4-pregnadiene-3,20 - dione 6 - methanesulfonate 21-acetate.

I. 9α-IODO-11β-FLUORO-16-METHYL-17α,21-DIHYDROXY-1,5-PREGNADIENE-3,20-DIONE

9α-iodo-11β-fluoro-16α-methyl - 6β,17α,21 - trihydroxy-1,4-pregnadiene-3,20-dione 6-methanesulfonate 21-acetate is reacted with zinc in aqueous ethanol in the manner described in Example 35E to give 9α-iodo-11β-fluoro-16α-methyl-17α,21-dihydroxy-1,5-pregnadiene-3,20 - dione 21-acetate which when subjected to the action of *Flavobacterium dehydrogenans* in the manner of Example 1C yields 9α-iodo-11β-fluoro-16α-methyl-17α,21 - dihydroxy-1,5-pregnadiene-3,20-dione.

In a similar manner, 9α-iodo-11β-fluoro-16β-methyl-6β,17α,21-trihydroxy-1,4-pregnadiene-3,20-dione, 6-methanesulfonate 21-acetate is reacted with zinc in aqueous ethanol in the above manner to give 9α-iodo-11β-fluoro-16β-methyl - 17α,21 - dihydroxy - 1,5-pregnadiene - 3,20-dione 21-acetate which is hydrolyzed to the corresponding 21-alcohol by means of *Flavobacterium dehydrogenans* to give 9α-iodo-11β-fluoro-16β-methyl-17α,21-dihydroxy-1,5-pregnadiene-3,20-dione.

A third method for preparing the compound of this example is described in following procedures J and K.

J. 9α-IODO-11β-FLUORO-16-METHYL-6β,17α,21-TRIHYDROXY-1,4-PREGNADIENE-3,20-DIONE 6-p-TOLUENESULFONATE 21-ACETATE

To a solution of 40 mg. of 9α-iodo-11β-fluoro-16α-methyl-6β,17α,21-trihydroxy-1,4-pregnadiene-3,20-dione 21-acetate (prepared as described in Example 35G) in 2 ml. of anhydrous pyridine is added 100 mg. of p-toluenesulfonyl chloride and the mixture is stirred for one hour. The solution is poured into aqueous sulfuric acid and ice. The resultant precipitate is removed by filtration, washed with water, dried and crystallized from acetone-hexane to give 9α-iodo-11β-fluoro-16α-methyl-6β,17α,21-trihydroxy-1,4-pregnadiene-3,20-dione 6-p-toluenesulfonate 21-acetate.

In a similar manner, 9α-iodo-11β-fluoro-16β-methyl-6β,17α,21-trihydroxy-1,4-pregnadiene-3,20-dione 21-acetate (prepared as described in Example 35G) is reacted with p-toluenesulfonyl chloride to give 9α-iodo-11β-fluoro-16β-methyl-6β,17α,21-trihydroxy-1,4-pregnadiene-3,20-dione 6-p-toluenesulfonate 21-acetate.

K. 9α-IODO-11β-FLUORO-16-METHYL-17α,21-DIHYDROXY-1,5-PREGNADIENE-3,20-DIONE

The 16α-methyl-6-p-toluenesulfonate-21-acetate-1,4-pregnadiene of Example 35J is reacted with zinc in aqueous ethanol in the manner described in Example 1B and the resultant product isolated and purified to give 9α-iodo-11β-fluoro-16α-methyl-17α,21-dihydroxy-1,5-pregnadiene-3,20-dione 21-acetate which is hydrolyzed by means of *Flavobacterium dehydrogenans* in the manner of Example 1C to give 9α-iodo-11β-fluoro-16α-methyl-17α,21-dihydroxy-1,5-pregnadiene-3,20-dione.

In a similar manner, the 16β-methyl-6-p-toluenesulfonate-21-acetate-1,4-pregnadiene (prepared as described in Example 35J) is reacted with zinc in aqueous ethanol to give 9α-iodo-11β-fluoro-16β-methyl-17α,21-dihydroxy-1,5-pregnadiene-3,20-dione 21-acetate which is hydrolyzed with *Flavobacterium dehydrogenans* to give 9α-iodo-11β-fluoro-16β-methyl-17α,21-dihydroxy-1,5-pregnadiene-3,20-dione.

EXAMPLE 36

*6-methyl-9α-iodo-11β-fluoro-17α,21-dihydroxy-1,5-pregnadiene-3,20-dione*

A. 6α-METHYL-9α-IODO-11β-FLUORO-17α,21-DIHYDROXY-1,4-PREGNADIENE-3,20-DIONE 21-ACETATE

6α-methyl-17α,21-dihydroxy-1,4,9(11)-pregnatriene-3,20-dione 21-acetate is reacted with potassium fluoride and N-iodosuccinimide in the manner described in Example 35A to give 6α-methyl-9α-iodo-11β-fluoro-17α,21-dihydroxy-1,4-pregnadiene-3,20-dione 21-acetate.

B. 6-METHYL-6-BROMO-9α-IODO-11β-FLUORO-17α,21-DIHYDROXY-1,4-PREGNADIENE-3,20-DIONE 21-ACETATE

In the manner described in Example 1A, 6α-methyl-9α-iodo-11β-fluoro-17α,21-dihydroxy-1,4-pregnadiene-3,20-dione 21-acetate is reacted with N-bromosuccinimide and the resultant product isolated and purified to give 6-methyl-6-bromo-9α-iodo-11β-fluoro-17α,21-dihydroxy-1,4-pregnadiene-3,20-dione 21-acetate.

C. 6-METHYL-9α-IODO-11β-FLUORO-17α,21-DIHYDROXY-1,5-PREGNADIENE-3,20-DIONE 21-ACETATE

In the manner of Example 1B, 6-methyl-6-bromo-9α-iodo-11β-fluoro-17α,21-dihydroxy-1,4-pregnadiene-3,20-dione 21-acetate is reacted with zinc in aqueous ethanol to give 6-methyl-9α-iodo-11β-fluoro-17α,21-dihydroxy-1,5-pregnadiene-3,20-dione 21-acetate.

D. 6-METHYL-9α-IODO-11β-FLUORO-17α,21-DIHYDROXY-1,5-PREGNADIENE-3,20-DIONE

The 21-acetate of Example 36C is hydrolyzed to the corresponding 21-alcohol by means of *Flavobacterium dehydrogenans* in the manner described in Example 1C to give 6-methyl-9α-iodo-11β-fluoro-17α,21-dihydroxy-1,5-pregnadiene-3,20-dione.

By going through the sequence of reactions described in above procedures A–D, 6β,16α-dimethyl-17α,21-dihydroxy-1,4,9(11)-pregnatriene-3,20-dione 21-acetate and 6β,16β-dimethyl-17α,21-dihydroxy-1,4,9(11)-pregnatriene-3,20-dione 21-acetate (prepared as described in Example 25) are each reacted with N-iodosuccinimide and potassium fluoride to give respectively 6β,16α-dimethyl-9α-iodo-11β-fluoro-17α,21-dihydroxy-1,4-pregnadiene-3,20-dione 21-acetate and 6β,16β-dimethyl-9α-iodo-11β-fluoro-17α,21-dihydroxy-1,4-pregnadiene-3,20-dione 21-acetate each of which, when reacted with N-bromosuccinimide, yields respectively 6,16α-dimethyl-6-bromo-9α-iodo-11β-fluoro-17α,21-dihydroxy-1,4-pregnadiene-3,20-dione and 6,16β-dimethyl-6-bromo-9α-iodo-11β-fluoro-17α,21-dihydroxy-1,4-pregnadiene-3,20-dione 21-acetate. The reaction with zinc in aqueous ethanol of each of the aforementioned 6-bromo intermediates yields respectively 6,16α-dimethyl-9α-iodo-11β-fluoro-17α,21-dihydroxy-1,5-pregnadiene-3,20-dione 21-acetate and 6,16β-dimethyl-9α-iodo-11β-fluoro-17α,21-dihydroxy-1,5-pregnadiene-3,20-dione 21-acetate each of which, upon hydrolysis with *Flavobacterium dehydrogenans*, yields respectively 6,16α-dimethyl-9α-iodo-11β-fluoro-17α,21-dihydroxy-1,5-pregnadiene-3,20-dione and 6,16β-dimethyl-9α-iodo-11β-fluoro-17α,21-dihydroxy-1,5-pregnadiene-3,20-dione.

EXAMPLE 37

*6-methyl-9α,11β-dibromo-17α,21-dihydroxy-1,5-pregnadiene-3,20-dione*

A. 6α-METHYL-9α,11β-DIBROMO-17α,21-DIHYDROXY-1,4-PREGNADIENE-3,20-DIONE 21-ACETATE

To a solution of 1.0 g. of 6α-methyl-17α,21-dihydroxy-1,4,9(11)-pregnatriene-3,20-dione 21-acetate in 40 ml. of methylene chloride, there is added dropwise at 0° C. a solution of 420 mg. of bromine in 5 ml. of methylene chloride. The reaction mixture is stirred at 0° C. for one hour then diluted with methylene chloride, washed with water, dried over anhydrous magnesium sulfate, and concentrated in vacuo. The residual oil is dissolved in acetone, treated with decolorizing carbon and crystallized from acetone-hexane yielding 6α-methyl-9α,11β-dibromo-17α,21-dihydroxy-1,4-pregnadiene-3,20-dione 21-acetate.

B. 6-METHYL-6,9α,11β-TRIBROMO-17α,21-DIHYDROXY-1,4-PREGNADIENE-3,20-DIONE 21-ACETATE

6α-methyl-9α,11β-dibromo-17α,21-dihydroxy-1,4-pregnadiene-3,20-dione 21-acetate is reacted with N-bromosuccinimide and the resultant product isolated and purified in the manner described in Example 1A to give 6-methyl-6,9α,11β-tribromo-17α,21-dihydroxy-1,4-pregnadiene-3,20-dione 21-acetate.

C. 6-METHYL-9α,11β-DIBROMO-17α,21-DIHYDROXY-1,5-PREGNADIENE-3,20-DIONE 21-ACETATE 6-methyl-6,9α,11β-tribromo-17α,21-dihydroxy-1,4-pregnadiene-3,20-dione 21-acetate is reacted with zinc in aqueous ethanol in the manner described in Example 1B to give 6-methyl-9α,11β-dibromo-17α,21-dihydroxy-1,5-pregnadiene-3,20-dione 21-acetate.

D. 6-METHYL-9α,11β-DIBROMO-17α,21-DIHYDROXY-1,5-PREGNADIENE-3,20-DIONE

In the manner described in Example 1C, the 21-acetate of Example 37C is hydrolyzed by means of *Flavobacterium dehydrogenans* and the resultant product isolated and purified to give 6-methyl-9α,11β-dibromo-17α,21-dihydroxy-1,5-pregnadiene-3,20-dione.

Similarly, by going through the series of reactions outlined in procedures 37A–D, 6β,16α-dimethyl-17α,21-dihydroxy-1,4,9(11)-pregnatriene-3,20-dione 21-acetate, 6β,16β-dimethyl-17α,21-dihydroxy-1,4,9(11)-pregnatriene-3,20-dione 21-acetate, 16α-methyl-17α,21-dihydroxy-1,4,9(11)-pregnatriene-3,20-dione 21-acetate and 6β-methyl-17α,21-dihydroxy-1,4,9(11)-pregnatriene-3,20-dione 21-acetate are first brominated to yield respectively 6β,16α-dimethyl- 9α,11β - dibromo - 17α,21 - dihydroxy - 1,4 - pregnadiene-3,20 - dione 21 - acetate, 6β,16β - dimethyl - 9α,11β-dibromo - 17α,21 - dihydroxy - 1,4 - pregnadiene - 3,20-dione 21 - acetate, 16α - methyl - 9α,11β - dibromo-17α,21 - dihydroxy - 1,4 - pregnadiene - 3,20 - dione 21-acetate and 16β - methyl - 9α,11β - dibromo - 17α,21-dihydroxy - 1,4 - pregnadiene - 3,20 - dione 21 - acetate each of which are then converted to the respective 6-bromo intermediates, i.e. 6,16α - dimethyl - 6,9α,11β-tribromo - 17α,21 - dihydroxy - 1,4 - pregnadiene - 3,20-dione 21 - acetate, 6,16β - dimethyl - 6,9α,11β - tribromo - 17α,21 - dihydroxy - 1,4 - pregnadiene - 3,20 - dione 21 - acetate, 16α - methyl - 6β,9α,11β - tribromo - 17α,21-dihydroxy - 1,4 - pregnadiene - 3,20 - dione 21 - acetate and 16β - methyl - 6β,9α,11β - tribromo - 17α,21 - dihydroxy - 1,4 - pregnadiene - 3,20 - dione 21 - acetate. Upon treatment of the aforementioned 6-bromo intermediates with zinc in aqueous ethanol there is obtained, respectively, 6,16α-dimethyl-9α,11β-dibromo-17α,21-dihydroxy - 1,5 - pregnadiene - 3,20 - dione 21 - acetate, 6,16β - dimethyl - 9α,11β - dibromo - 17α,21 - dihydroxy-1,5-pregnadiene - 3,20 - dione 21 - acetate, 16α - methyl-9α,11β - dibromo - 17α,21 - dihydroxy - 1,5 - pregnadiene-3,20-dione 21-acetate, and 16β-methyl-9α, 11β-dibromo - 17α,21 - dihydroxy - 1,5 - pregnadiene - 3,20-dione 21-acetate each of which when hydrolyzed with *Flavobacterium dehydrogenans*, yields 6,16α-dimethyl-9α,11β-dibromo - 17α,21 - dihydroxy - 1,5 - pregnadiene - 3,20-dione, 6,16β - dimethyl - 9α,11β - dibromo - 17α,21 - dihydroxy - 1,5 - pregnadiene - 3,20 - dione, 16α - methyl-9α,11β - dibromo - 17α,21 - dihydroxy - 1,5 - pregnadiene - 3,20 - dione, and 16β - methyl - 9α,11β - dibromo-17α,21 - dihydroxy - 1,5 - pregnadiene - 3,20 - dione.

EXAMPLE 38

*6-methyl-9α,11β-dichloro-16α,17α-isopropylidenedioxy-21-hydroxy-1,5-pregnadiene-3,20-dione*

A. 6-METHYL-6-BROMO - 9α,11β - DICHLORO - 16α,17α-ISOPROPYLIDENEDIOXY - 21 - HYDROXY - 1,4 - PREGNADIENE-3,20-DIONE 21-ACETATE

6α - methyl - 9α,11β - dichloro - 16α,17α - isopropylidenedioxy - 21 - hydroxy - 1,4 - pregnadiene - 3,20 - dione 21-acetate is reacted with N-bromosuccinimide in the manner similar to that described in Example 1A and the resultant product isolated and purified to give 6-methyl - 6 - bromo - 9α,11β - dichloro - 16α,17α - isopropylidenedioxy - 21 - hydroxy - 1,4 - pregnadiene - 3,20-dione 21-acetate.

B. 6-METHYL - 9α,11β - DICHLORO - 16α,17α - ISOPROPYLIDENEDIOXY - 21 - HYDROXY-1,5-PREGNADIENE-3,20-DIONE 21-ACETATE

6 - methyl - 6 - bromo - 9α,11β - dichloro - 16α,17α-isopropylidene - dioxy - 21 - hydroxy - 1,4 - pregnadiene-3,20-dione 21-acetate (800 mg.) is dissolved in 10 ml. of tetrahydrofuran and 4 g. of magnesium turnings are added. This mixture is stirred at room temperature for one hour then 25 ml. of 5% aqueous ammonium sulfate is added. This mixture is stirred another hour then chloroform is added and the organic solvent layer is separated from the aqueous layer. The chloroform solution is concentrated in vacuo to yield a residue of 6-methyl - 9α,11β - dichloro - 16α,17α - isopropylidenedioxy - 21 - hydroxy - 1,5 - pregnadiene - 3,20 - dione 21-acetate.

C. 6-METHYL - 9α,11β - DICHLORO - 16α,17α - ISOPROPYLIDENEDIOXY-21-HYDROXY - 1,5 - PREGNADIENE - 3,20-DIONE

The 21-acetate of Example 38B is hydrolyzed to the corresponding 21-alcohol with the aid of a culture of *Flavobacterium dehydrogenans* in the manner described in Example 1C to yield 6 - methyl - 9α,11β - dichloro-16α,17α - isopropylidenedioxy - 21 - hydroxy - 1,5 - pregnadiene-3,20-dione.

We claim:

1. Compounds of the group consisting of 9α,11β-dihalogeno-1,5-pregnadienes of the following formulae:

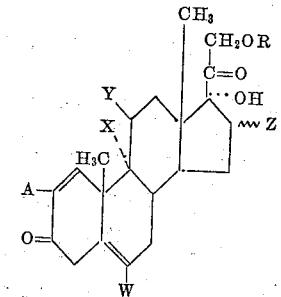

and

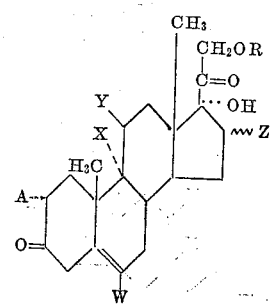

wherein A and W are members of the group consisting of hydrogen and methyl, at least one of A and W being hydrogen; X is halogen; Y is a halogen having an atomic weight less than 126; Z is a member of the group consisting of hydrogen, lower alkyl, and OR', wherein R' is a member of the group consisting of hydrogen and lower alkanoyl, and when R' is hydrogen, the 16α,17α-alkylidenedioxy derivatives thereof; and R is a member of the group consisting of hydrogen and acid radicals of the group consisting of hydrocarbon monocarboxylic acids having up to 8 carbon atoms, dibasic organic acids having up to 8 carbon atoms, sulfate, and phosphate.

2. 9α - X - 11β - Y - 17α,21 - dihydroxy - 5 - pregnene-3,20-dione wherein X is halogen and Y is a halogen having an atomic weight less than 126.

3. 9α - X - 11β - Y - 17α,21 - dihydroxy - 1,5 - pregnadiene-3,20-dione wherein X is a halogen and Y is a halogen having an atomic weight less than 126.

4. The 21-acylates of 9α-X-11β-Y-17α,21-dihydroxy-1,5-pregnadiene-3,20-dione wherein X is halogen and Y is a halogen having an atomic weight less than 126, and the acyl group is that of a hydrocarbon monocarboxylic acid containing up to 8 carbon atoms.

5. 9α - X - 11β - Y - 6 - methyl - 17α,21 - dihydroxy-1,5-pregnadiene-3,20-dione wherein X is halogen and Y is a halogen having an atomic weight less than 126.

6. 9α - X - 11β - Y - 16- methyl - 17α,21 - dihydroxy-1,5-pregnadiene-3,20-dione wherein X is halogen and Y is a halogen having an atomic weight less than 126.

7. The 21-acylates of 9α-X-11β-Y-16-methyl-17α,21-dihydroxy-1,5-pregnadiene-3,20-dione wherein X is halogen and Y is a halogen having an atomic weight less than 126, and the acyl group is that of a hydrocarbon monocarboxylic acid containing up to 8 carbon atoms.

8. 9α - X - 11β - Y - 16α,17α - isopropylidenedioxy-21-hydroxy-1,5-pregnadiene-3,20-dione wherein X is halogen and Y is a halogen of atomic weight less than 126.

9. 9α - X - 11β - Y - 6,16 - dimethyl - 17α,21 - dihydroxy-1,5-pregnadiene-3,20-dione wherein X is halogen and Y is a halogen having an atomic weight less than 126.

10. 9α - X - 11β - Y - 6 - methyl - 16α,17α,21 - trihydroxy-1,5-pregnadiene-3,20-dione wherein X is halogen and Y is a halogen having an atomic weight less than 126.

11. 9α,11β - dichloro - 17α,21 - dihydroxy - 5 -pregnene-3,20-dione.
12. 9α,11β - dichloro - 17α,21 - dihydroxy - 1,5 - pregnadiene-3,20-dione.
13. 6 - methyl - 9α,11β - dichloro - 17α,21 - dihydroxy-1,5-pregnadiene-3,20-dione.
14. 9α,11β - dichloro - 16α - methyl - 17α,21 - dihydroxy-1,5-pregnadiene-3,20-dione.
15. 9α,11β - dichloro - 16β - methyl - 17α,21 - dihydroxy-1,5-pregnadiene-3,20-dione.
16. 9α,11β - dichloro - 16α,17α,21 - trihydroxy - 1,5-pregnadiene-3,20-dione.
17. 9α,11β - dichloro - 6,16 - dimethyl - 17α,21 - dihydroxy-1,5-pregnadiene-3,20-dione.
18. 9α,11β - dichloro - 17α,21 - dihydroxy - 1,5 - pregnadiene-3,20-dione 21-acetate.
19. 9α,11β - dichloro - 16α - methyl - 17α,21 - dihydroxy-1,5-pregnadiene-3,20-dione 21-acetate.
20. 9α,11β - dichloro - 16β - methyl - 17α,21 - dihydroxy-1,5-pregnadiene-3,20-dione 21-acetate.
21. A compound of the group consisting of steroid derivatives of the following formulae:

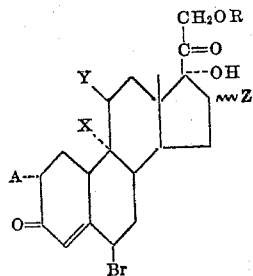

and

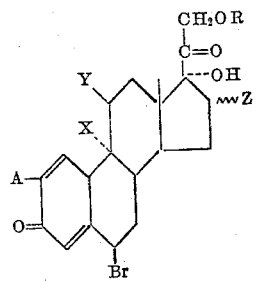

wherein A is a member of the group consisting of hydrogen and methyl; X is halogen; Y is a halogen having an atomic weight less than 126; Z is a member of the group consisting of H, lower alkyl, and OR', wherein R' is a member of the group consisting of hydrogen and lower alkanoyl and when R' is hydrogen, the 16α,17α-alkylidenedioxy derivatives thereof; and R is a member of the group consisting of hydrogen and acid radicals of the group consisting of hydrocarbon monocarboxylic acids having up to 8 carbon atoms, dibasic organic acids having up to 8 carbon atoms, sulfate, and phosphate; and, when A is hydrogen, the 6-methyl-analogs thereof.

References Cited in the file of this patent
UNITED STATES PATENTS 2,894,963    Gould et al.   ----------- July 14, 1959
2,908,696    Nussbaum et al.   ---------- Oct. 13, 1959

OTHER REFERENCES

Robinson et al.: J. Am. Chem. Soc., vol. 81 (May 5, 1959), pages 2191–2195 (page 2191 necessary).

UNITED STATES PATENT OFFICE
CERTIFICATE OF CORRECTION

Patent No. 3,013,011                        December 12, 1961

Alexander L. Nussbaum et al.

It is hereby certified that error appears in the above numbered patent requiring correction and that the said Letters Patent should read as corrected below.

Column 35, lines 23 to 35, and column 36, lines 1 to 13, the formulas should appear as shown below instead of as in the patent:

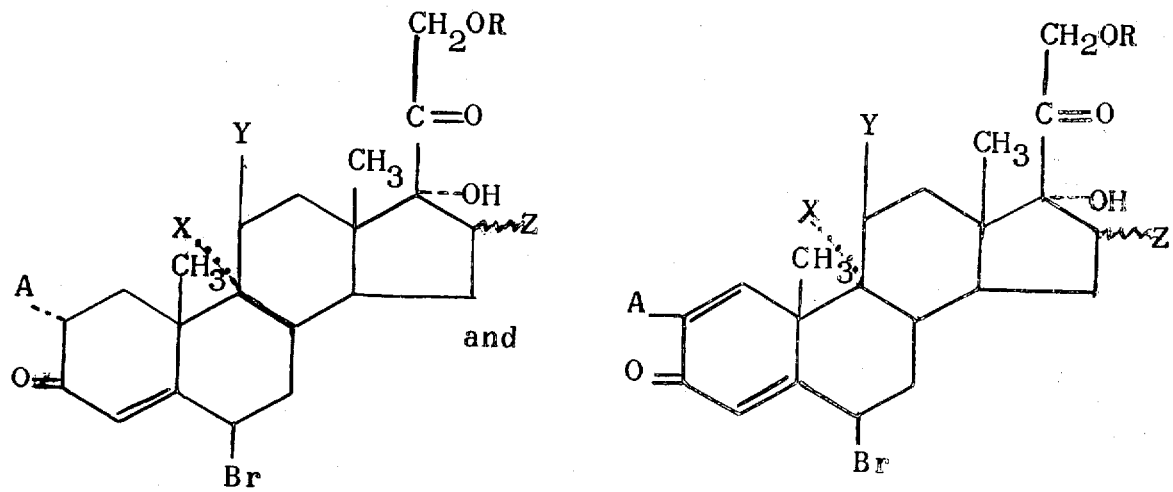

Signed and sealed this 10th day of July 1962.

(SEAL)
Attest:

ERNEST W. SWIDER
Attesting Officer

DAVID L. LADD
Commissioner of Patents